(12) United States Patent
Roever et al.

(10) Patent No.: US 7,707,066 B2
(45) Date of Patent: Apr. 27, 2010

(54) METHODS OF FACILITATING MERCHANT TRANSACTIONS USING A COMPUTERIZED SYSTEM INCLUDING A SET OF TITLES

(75) Inventors: Stefan Roever, Los Altos Hills, CA (US); Kevin Collins, Folsom, CA (US); Josh C. Ding, San Jose, CA (US); Alex F. Clark, Campbell, CA (US); James Bruce, Scotts Valley, CA (US)

(73) Assignee: Navio Systems, Inc., San Jose, CA (US)

( * ) Notice: Subject to any disclaimer, the term of this patent is extended or adjusted under 35 U.S.C. 154(b) by 965 days.

(21) Appl. No.: 10/414,817

(22) Filed: Apr. 15, 2003

(65) Prior Publication Data

US 2005/0251452 A1 Nov. 10, 2005

Related U.S. Application Data

(63) Continuation-in-part of application No. 10/232,861, filed on Aug. 30, 2002.

(60) Provisional application No. 60/380,787, filed on May 15, 2002, provisional application No. 60/407,466, filed on Aug. 30, 2002, provisional application No. 60/407,382, filed on Aug. 30, 2002.

(51) Int. Cl.
*G06Q 30/00* (2006.01)

(52) U.S. Cl. .............................. 705/26; 705/51; 705/64

(58) Field of Classification Search ............. 705/26–27, 705/1, 51, 64, 39, 74
See application file for complete search history.

(56) References Cited

U.S. PATENT DOCUMENTS 5,455,407 A 10/1995 Rosen (Continued)

FOREIGN PATENT DOCUMENTS

JP 02-245970 * 1/1990

(Continued)

OTHER PUBLICATIONS

"US Navy: Military exchanges now offer best-price guarentees". M2 Presswire. Coventry: Jun. 4, 1998. p. 1. [recovered from Proquest May 17, 2006].*

(Continued)

*Primary Examiner*—Andrew J. Fischer
*Assistant Examiner*—Chrystina Zelaskiewicz
(74) *Attorney, Agent, or Firm*—Weaver Austin Villeneuve & Sampson LLP

(57) ABSTRACT

A method of facilitating a transaction between a merchant and a buyer using a computerized system including a set of titles. The method includes storing the set of titles in a merchant site corresponding to a set of products for sale; browsing the merchant site using a client device and selecting a product for purchase; and generating a payment slip title for the product including information relating to a payment amount and a buyer identifier. The method further includes selecting a payment structure from a set of available payment structures; modifying the payment slip title to include information corresponding to the selected payment structure; releasing the product title to the buyer; and transmitting the payment amount to the merchant.

34 Claims, 37 Drawing Sheets

U.S. PATENT DOCUMENTS

| | | | |
|---|---|---|---|
| 5,606,609 | A | 2/1997 | Houser et al. |
| 5,629,980 | A | 5/1997 | Stefik et al. |
| 5,752,020 | A | 5/1998 | Ando |
| 5,778,182 | A | 7/1998 | Cathey et al. |
| 5,794,217 | A | 8/1998 | Allen |
| 5,892,900 | A * | 4/1999 | Ginter et al. .................. 726/26 |
| 5,903,880 | A | 5/1999 | Biffar |
| 5,905,976 | A * | 5/1999 | Mjolsnes et al. .............. 705/39 |
| 5,956,736 | A | 9/1999 | Hanson et al. |
| 6,065,117 | A | 5/2000 | White |
| 6,098,056 | A | 8/2000 | Rusnak et al. |
| 6,119,229 | A | 9/2000 | Martinez et al. |
| 6,154,214 | A | 11/2000 | Uyehara et al. |
| 6,170,744 | B1 | 1/2001 | Lee et al. |
| 6,189,097 | B1 | 2/2001 | Tycksen, Jr. et al. |
| 6,205,436 | B1 | 3/2001 | Rosen et al. |
| 6,212,504 | B1 | 4/2001 | Hayosh |
| 6,330,544 | B1 | 12/2001 | Walker et al. |
| 6,341,353 | B1 | 1/2002 | Herman et al. |
| 6,372,974 | B1 | 4/2002 | Gross et al. |
| 6,378,075 | B1 | 4/2002 | Goldstein et al. |
| 6,389,541 | B1 | 5/2002 | Patterson |
| 6,574,609 | B1 | 6/2003 | Downs et al. |
| 6,578,078 | B1 | 6/2003 | Smith |
| 6,591,260 | B1 | 7/2003 | Schwarzhoff et al. |
| 6,600,823 | B1 | 7/2003 | Hayosh |
| 6,629,081 | B1 | 9/2003 | Cornelius et al. |
| 6,662,340 | B2 | 12/2003 | Rawat et al. |
| 6,675,153 | B1 | 1/2004 | Cook et al. |
| 6,751,670 | B1 | 6/2004 | Patterson |
| 6,772,341 | B1 | 8/2004 | Shrader et al. |
| 6,868,392 | B1 | 3/2005 | Ogasawara |
| 6,871,220 | B1 | 3/2005 | Rajan et al. |
| 6,895,392 | B2 | 5/2005 | Stefik et al. |
| 6,898,576 | B2 | 5/2005 | Stefik et al. |
| 6,910,179 | B1 | 6/2005 | Pennell et al. |
| 6,913,193 | B1 | 7/2005 | Kawan |
| 6,938,021 | B2 | 8/2005 | Shear et al. |
| 6,944,776 | B1 | 9/2005 | Lockhart et al. |
| 6,947,556 | B1 | 9/2005 | Matyas et al. |
| 6,947,571 | B1 | 9/2005 | Rhoads et al. |
| 7,010,512 | B1 * | 3/2006 | Gillin et al. ................... 705/39 |
| 7,016,877 | B1 | 3/2006 | Steele et al. |
| 7,020,626 | B1 | 3/2006 | Eng et al. |
| 7,028,009 | B2 | 4/2006 | Wang et al. |
| 7,069,234 | B1 | 6/2006 | Cornelius et al. |
| 7,103,574 | B1 | 9/2006 | Peinado et al. |
| 7,130,829 | B2 | 10/2006 | Banerjee et al. |
| 7,191,332 | B1 | 3/2007 | Pankajakshan et al. |
| 7,275,260 | B2 | 9/2007 | De Jong et al. |
| 7,346,923 | B2 | 3/2008 | Atkins |
| 7,392,226 | B1 | 6/2008 | Sasaki et al. |
| 7,401,221 | B2 | 7/2008 | Adent et al. |
| 7,426,492 | B1 | 9/2008 | Bishop et al. |
| 7,444,519 | B2 | 10/2008 | Laferriere et al. |
| 2001/0008557 | A1 | 7/2001 | Stefik et al. |
| 2001/0026287 | A1 | 10/2001 | Watanabe |
| 2001/0032312 | A1 | 10/2001 | Runje et al. |
| 2002/0026445 | A1 | 2/2002 | Chica et al. |
| 2002/0029183 | A1 | 3/2002 | Vlahoplus et al. |
| 2002/0032646 | A1 | 3/2002 | Sweeney et al. |
| 2002/0038278 | A1 | 3/2002 | Himmelstein |
| 2002/0040346 | A1 | 4/2002 | Kwan |
| 2002/0062249 | A1 | 5/2002 | Iannacci |
| 2002/0082961 | A1 | 6/2002 | Abrahm |
| 2002/0091643 | A1 | 7/2002 | Okamoto et al. |
| 2002/0091646 | A1 | 7/2002 | Lake et al. |
| 2002/0106081 | A1 * | 8/2002 | Yang .......................... 380/201 |
| 2002/0116471 | A1 | 8/2002 | Shteyn |
| 2002/0143703 | A1 * | 10/2002 | Razvan et al. ................. 705/44 |
| 2002/0147929 | A1 | 10/2002 | Rose |
| 2002/0152126 | A1 | 10/2002 | Lieu et al. |
| 2002/0152173 | A1 | 10/2002 | Rudd |
| 2002/0184504 | A1 | 12/2002 | Hughes |
| 2003/0023561 | A1 * | 1/2003 | Stefik et al. ................... 705/51 |
| 2003/0023564 | A1 | 1/2003 | Padhye et al. |
| 2003/0028489 | A1 | 2/2003 | Williamson |
| 2003/0061566 | A1 | 3/2003 | Rubstein et al. |
| 2003/0079122 | A1 | 4/2003 | Asokan et al. |
| 2003/0125965 | A1 | 7/2003 | Falso |
| 2003/0140034 | A1 | 7/2003 | Probst et al. |
| 2003/0159043 | A1 | 8/2003 | Epstein |
| 2003/0182142 | A1 | 9/2003 | Valenzuela et al. |
| 2003/0196087 | A1 | 10/2003 | Stringer et al. |
| 2003/0200439 | A1 | 10/2003 | Moskowitz |
| 2003/0208406 | A1 | 11/2003 | Okamoto et al. |
| 2003/0217006 | A1 | 11/2003 | Roever et al. |
| 2003/0229593 | A1 | 12/2003 | Raley |
| 2004/0039916 | A1 | 2/2004 | Aldis et al. |
| 2004/0044627 | A1 | 3/2004 | Russell |
| 2004/0054630 | A1 | 3/2004 | Ginter |
| 2004/0054915 | A1 | 3/2004 | Jong et al. |
| 2004/0113792 | A1 | 6/2004 | Ireland et al. |
| 2004/0128546 | A1 | 7/2004 | Blakley |
| 2004/0139207 | A1 | 7/2004 | de Jong |
| 2004/0196981 | A1 | 10/2004 | Nakano et al. |
| 2004/0199577 | A1 | 10/2004 | Burd et al. |
| 2004/0221045 | A1 | 11/2004 | Joosten et al. |
| 2004/0243517 | A1 | 12/2004 | Hansen |
| 2004/0267671 | A1 | 12/2004 | Nonaka et al. |
| 2004/0267673 | A1 | 12/2004 | Ballard et al. |
| 2005/0004875 | A1 | 1/2005 | Kontio et al. |
| 2005/0027804 | A1 | 2/2005 | Cahill et al. |
| 2005/0038707 | A1 | 2/2005 | Roever et al. |
| 2005/0038724 | A1 | 2/2005 | Roever et al. |
| 2005/0234860 | A1 | 10/2005 | Roever et al. |
| 2005/0246193 | A1 | 11/2005 | Roever et al. |
| 2005/0247777 | A1 | 11/2005 | Pitroda |
| 2005/0273805 | A1 | 12/2005 | Roever et al. |
| 2006/0036447 | A1 | 2/2006 | Roever et al. |
| 2006/0036548 | A1 | 2/2006 | Roever et al. |
| 2006/0167815 | A1 | 7/2006 | Peinado et al. |
| 2006/0170759 | A1 | 8/2006 | Roever et al. |
| 2006/0174350 | A1 | 8/2006 | Roever et al. |
| 2006/0259422 | A1 * | 11/2006 | Sutton et al. .................. 705/39 |
| 2007/0016533 | A1 | 1/2007 | Fujimura |
| 2007/0286393 | A1 | 12/2007 | Roever et al. |
| 2008/0067230 | A1 | 3/2008 | Silverbrook et al. |

FOREIGN PATENT DOCUMENTS

| | | | |
|---|---|---|---|
| JP | 2001338242 A | 12/2001 | |
| WO | WO03/098398 | 11/2003 | |

OTHER PUBLICATIONS

G. Ahn and J. Lam, "Managing privacy preferences for federated identity management," in Proc. DIM '05: Proceedings of the 2005 workshop on Digital identity management, Fairfax, VA, USA, 2005, pp. 28-36.

Alladin/Preview Systems, "HASP SL," Alladin/Preview Systems. 2004.

K. Bohrer and B. Holland, "Customer Profile Exchange (CPExchange) Specification," International Digital Enterprise Alliance, Inc., Version 1.0, Oct. 20, 2000.

D. Burdett. RFC 2801: Internet Open Trading Protocol. [Online]. Apr. 2000. Available: http://www.faqs.org/rIcs/ rfc2801.html.

Business.com. Preview Systems, Inc. Profile. [Online]. 2006. Available: http://www.business.com/directory/ telecommunications/preview_systems_inc/profile/.

Cover Pages. Internet Open Trading Protocol. [Online]. Dec. 2002. Available: http://xml.coverpages.org/otp.html.

Cover Pages. IETF Internet Open Trading Protocol Working Group Publishes RFC for Voucher Trading System. [Online]. May 2003. Available: http://xml.coverpages.org/ni2003-05-15-a.html.

Cover Pages. XML Voucher: Generic Voucher Language. [Online]. May 2003. Available: http://xml.coverpages.org/xmlVoucher.html.
B. Cox, J. Tygar, and M. Sirbu, "Netbill Security and Transaction Protocol," First USENIX Workshop on Electronic Commerce, Jul. 1995.
FlexTicket. [Online]. Available: http://info.isl.ntt.co.jp/flexticket/index.html.
K. Fujimura and D. Eastlake, RFC 3506: Requirements and Design for Voucher Trading System (VTS), United States: Network Working Group, Mar. 2003.
K. Fujimura, Y. Nakajima, and J. Sekine, XML Ticket: Generalized Digital Ticket Definition Language. 1999.
K. Fujimura, Y. Nakajima, General Purpose Digital Ticket Framework. Boston, Mass.: 3rd USENIX Workshop on Electronic Commerce, 1998.
K. Fujimura, H. Kuno, M. Terada, K. Matsuyama, Y. Mizuno, and J. Sekine, Digital ticket controlled digital ticket circulation. USENIX, 1999.
K. Fujimura, M. Terada, and J. Sekine, "A World Wide Supermarket Scheme Using Rights Trading System," in Proc. ICPADS '00: Proceedings of the Seventh International Conference on Parallel and Distributed Systems: Workshops, Washington, DC, USA, 2000, p. 289.
M. Iguchi et al. Voucher Integrated C2B and C2C Trading Model. May, 2002. [Online]. Available: http://wwwconf.ecs.soton.ac.uk/archive/00000272/01/index.html.
T. Hardjono and J. Seberry, Strongboxes for Electronic Commerce. Oakland, Calif.: 2nd USENIX Workshop on Electronic Commerce, 1996.
A. Josang, J. Fabre, B. Hay, J. Dalziel and S. Pope. "Trust Requirements in Identity Management." Australasian Information Security Workshop 2005.
M. Kumar, A. Rangachari, A. Jhingran, and R. Mohan, Sales Promotions on the Internet. Boston, Mass.: 3rd USENIX Workshop on Electronic Commerce, 1998.
K. Matsuyama and K. Fujimura, "Distributed digital-ticket management for rights trading system," in Proc. EC '99: Proceedings of the 1st ACM conference on Electronic commerce, Denver, Colorado, United States, 1999, pp. 110-118.
G. Medvinksy and B. C. Neuman, NetCash: A design for practical electronic currency on the Internet. Proceedings of the First ACM Conference on Computer and Communications Security, Nov. 1993.
M. Mont, S. Pearson, P. Bramhall "Towards Accountable Management of Identity and Privacy: Sticky Policies and Enforceable Tracing Services," Hewlett Packard, 2003.
OECD. (Jan. 27, 2006) OECD Guidelines on the Protection of Privacy and Transborder Flows of Personal Data [br] . [Online]. Available: http://www.oecd.org/document/18/0,2340,en_2649_201185_1815186_1_1_1_1,00.
D. Stewart. The Future of Digital Cash on the Internet. [Online]. Available: http://www.arraydev.com/commerce/JIBC/9703-02.html.
M. Terada, H. Kuno, M. Hanadate, and K. Fujimara, Copy Prevention Scheme for Rights Trading Infrastructure, 2000.
M. Terada and K. Fujimara, RFC 4153: "XML Voucher: Generic Voucher Language," Network Working Group, Sep. 2005.
M. Terada. RFC 4154: Voucher Trading System Application Programming Interface. Sep. 2005. [Online]. Available: http://www.rfc-archive.org/getrfc.php?rfc=4154.
D. Weitzel "Liberty ID-WSF Implementation Guide" Draft Version 1.0-1.2, Liberty Alliance Project. 2004-2005.
Skinner et al., "A Framework of privacy shield in organizational information systems," 2005.
U.S. Office Action mailed Feb. 9, 2005, from related U.S. Appl. No. 10/232,861.
U.S. Office Action mailed Jul. 27 2005, from related U.S. Appl. No. 10/232,861.
U.S. Office Action mailed Dec. 2, 2005, from related U.S. Appl. No. 10/232,861.
U.S. Office Action mailed Nov. 30, 2006, from related U.S. Appl. No. 10/232,861.
U.S. Office Action mailed Jun. 21, 2006, from related U.S. Appl. No. 10/232,861.
Final Office Action mailed Jun. 14, 2007, from related U.S. Appl. No. 10/232,861.
U.S. Office Action mailed Dec. 22, 2005, from related U.S. Appl. No. 10/414,830.
U.S. Office Action mailed Feb. 7, 2007, from related U.S. Appl. No. 10/414,830.
U.S. Office Action mailed Dec. 20, 2005, from related U.S. Appl. No. 10/440,286.
U.S. Office Action mailed Jul. 13, 2006, from related U.S. Appl. No. 10/440,286.
U.S. Office Action mailed Jan. 30, 2007, from related U.S. Appl. No. 10/440,286.
Final Office Action mailed Jun. 13, 2007, from related U.S. Appl. No. 10/440,286.
http://legalminds.lp.findlaw.com/list/cyberia-1/msg31650.html), Robert A. Hettinga, May 29, 2001.
http://www.nettime.org/Lists-Archives/nettime-1-0009/msg00214.html, Dr. Richard W. Rahn, Sep. 19, 2000.
Office Action dated May 15, 2008 from U.S. Appl. No. 10/232,861.
Office Action dated Aug. 6, 2008 from U.S. Appl. No. 10/440,286.
Office Action dated May 14, 2008 from U.S. Appl. No. 11/118,608.
Restriction Requirement dated Sep. 24, 2008 from U.S. Appl. No. 11/146,399.
Office Action dated Oct. 3, 2008 from U.S. Appl. No. 11/094,784.
International Search Report and Written Opinion dated Dec. 7, 2007 from International Application No. PCT/US07/10708.
International Search Report and Written Opinion dated Feb. 20, 2008 from International Application No. PCT/US06/48776.
International Search Report and Written Opinion dated Nov. 25, 2003 from International Application No. PCT/US03/15614.
International Search Report and Written Opinion dated Sep. 16, 2008 from International Application No. PCT/US07/10560.
Office Action dated Feb. 25, 2008 from U.S. Appl. No. 10/873,840.
Final Office Action dated Dec. 3, 2008 from U.S. Appl. No. 10/873,840.
Final Office Action dated Dec. 5, 2008 from U.S. Appl. No. 10/232,861.
Office Action dated Nov. 18, 2008 from U.S. Appl. No. 10/440,286.
Office Action dated Feb. 11, 2009 from U.S. Appl. No.—10/440,286.
Office Action dated Oct. 23, 2008 from U.S. Appl. No. 10/439,629.
Office Action dated Jan. 28, 2009 from U.S. Appl. No. 10/439,629.
Office Action dated Nov. 10, 2008 from U.S. Appl. No. 11/118,608.
International Search Report and Written Opinion dated Feb. 16, 2006 from PCT Application No. PCT/US2005/021057.
Notification Concerning Transmittal of International Preliminary Report on Patentability dated Jan. 11, 2007 from PCT Application No. PCT/US2005/021057.
European Office Action dated Oct. 27, 2008 from EP Application No. 03726905.7
Chinese Office Action dated Dec. 26, 2008 from CN Application No. 03816746.8.
International Search Report and Written Opinion dated Sep. 16, 2008 from PCT Application No. PCT/US07/10560.
International Search Report & Written Opinion dated Dec. 7, 2007 from PCT Application No. PCT/US07/010708.
International Search Report & Written Opinion dated Feb. 20, 2008 from PCT Application No. PCT/US06/48776.
N. Szabo, "Contracts with Bearer" http://szabo.best.vwh.net/bearer_contracts.html, 12 pages (1997).
Kuno et al., "A Digital Ticket Circulation Architecture, 58th Conference Collected Papers (4)", Information Processing Society of Japan, Japan, Mar. 11, 1999, pp. 4-295-4-296.
Office Action dated Sep. 15, 2009 from U.S. Appl. No. 10/873,841.
Office Action dated Mar. 27, 2009 from U.S. Appl. No. 11/096,284.
Office Action dated May 28, 2009 from U.S. Appl. No. 10/873,840.
JP Office Action dated Mar. 24, 2009 from JP Application No. 2004-505848.
Office Action dated Jun. 24, 2009 from U.S. Appl. No. 10/232,861.
Office Action dated Aug. 24, 2009 from U.S. Appl. No. 11/155,010.
Final Office Action dated Apr. 16, 2009 from U.S. Appl. No. 11/118,608.
Office Action dated Mar. 16, 2009 from U.S. Appl. No. 11/146,399.

R.A. Hettinga, "UNDRs and Bearer other stuff" besides cash (was Re: ESIGN Act), May 29, 2001.

Menezes et al., "Handbook of Applied Cryptography", 1997 CRC Press LLC, Section 1.7.

U.S. Office Action mailed Dec. 27, 2007, from related U.S. Appl. No. 10/440,286.

U.S. Office Action mailed Jan. 14, 2008, from related U.S. Appl. No. 10/439,629.

U.S. Office Action mailed Sep. 26, 2007, from related U.S. Appl. No. 11/118,608.

* cited by examiner

| ABC's Trades | | |
|---|---|---|
| Queue List | To | Description | Sent |
| INBOX | Trader#1 | mySong#2 | 2002-05-06 |
| OUTBOX | Trader#2 | mySong#3 | 2002-05-07 — 883 |
| COMPLETETD | Trader#2 | myMovie#2 | 2002-05-08 |

| ABD Item for Trade | Trader#2 Item for Trade |
|---|---|
| mySong#4 | Person has been notified, waiting for response. |
| [smiley face image] xxx xxxxx xxxx xxxxx xxxxx xx xxx xxx. Xx xxxx xx xxx xxxxx, xx xxx xx.xxxx xxxxxx xx xxx. Xx xxxx xx xxx xxxxx, xx xxx xx. xxx xxxxx xxxx xxxxx xxxxx xx xxx xxx. Xx xxxx xx xxx xxxxx, xx xxx xx. Issued By: myContentOwner Valid From: null Quantity: 3 Value: $0.01 Exchange Limit: No Limit — 891 View Sample | Send Another Notice |
| Note: I would like to get mySong#8. | :: Cancel   Trade — 846 |

FIG. 8E

ABC's Profile

[ Personal | Business | Financial | Emergency | Preferences ]

1032

☐ Company Name: [Company] — 1034
☐ Web Site: [http://www.Company.com] — 1036
☐ Work Phone #: [123-123-4567] — 1038
☐ Work Email: [abc@company.com] — 1040
☐ Job Title: [VP Engineering] — 1042
☐ Work Address (Street): [1234 Boulevard Drive] — 1044
☐ (City, State, Zip) [City] [ST] [12345] — 1046

[Submit Changes] — 1022

| TITLE DATA TABLE |
|---|
| Title 1 - Currency |
| Title 2 - Account |
| Title 3 - Currency |
| Title 4 - Sales Order |
| Title 5 - Account |
| • • • |
| Title N - Payment Slip |

1342
1344
1346
1348

FIG. 13E

METHODS OF FACILITATING MERCHANT TRANSACTIONS USING A COMPUTERIZED SYSTEM INCLUDING A SET OF TITLES

REFERENCE TO RELATED APPLICATIONS

This application is a continuation-in-part of U.S. Ser. No. 10/232,861 (APLD-P001) filed on Aug. 30, 2002.

This application claims priority to U.S. Prov. No. 60/380,787 (APLD-P001-P) filed May 15, 2002, U.S. Prov. No 60/407,466 (APLD-P002-P) filed Aug. 30, 2002 and U.S. Prov. No 60/407,382 (APLD-P003-P) filed Aug. 30, 2002.

TECHNICAL FIELD

The invention relates to an advanced title and transaction network. In particular, the invention provides an architecture and operation for the facilitation of the creation, ownership, exchange, management, reselling, marketing, bartering, and auctioning of titles over an electronic network such as the Internet.

BACKGROUND OF THE INVENTION

The Internet has become an efficient mechanism for globally distributing digital content, such as documents, pictures, music, and other types of digital content. Information can now be transmitted directly and instantly across the Internet from the content owner to the content buyer, without having to first convert it into physical form, such as paper documents, compact disks, photographs, etc.

However, the advantage of easy digital communication has also allowed digital content to be easily pirated by just about anyone with a computer and Internet access. The combination of high-speed broadband Internet access, digital content compression software (which reduces the size of digital content files), peer-to-peer file trading networks (which allows users to post content files), and lack of a viable digital rights standard, has caused the content owners to lose control of their content. Consequently, content owners are experiencing a loss of potential revenue.

The lack of a standardized and transparent digital rights management system, however, is preventing a commercially viable solution from emerging. In order for such a system to be commercially viable, the system should be secure both from the user's and the content owner's standpoint, universal so that electronic device manufactures are encouraged to engineer it into their products, and transparent so that users are not required to change their behavior.

Existing systems that attempt to provide confidence between buyers include escrow agreements, third party confirmations, third party appraisals and other similar techniques. These systems are slow and complex, and they do not provide the content user with sufficient confidence that the buyers and sellers are not illegally replicating the content or otherwise attempting to sell pirated copies of works.

In addition to the pirating aspects associated with sharing digital content, users are burdened with less than ideal methods for legally sharing digital content. These cumbersome methods include transferring entire files to other users via electronic mail, instant messenger, peer-to-peer and other applications, or sharing hyperlinks via electronic mail, instant messenger, and other applications. These methods can be viewed as counter productive, anti-social and even bothersome to the users that receive or attempt to share the content. Sharing of entire digital content such as music via electronic mail is a drain on resources and inefficient to the electronic mail servers, the network, and the receiving users. Sharing of hyperlinks can lead to broken links, complex URL (Universal Resource Locator) strings, and restrictions on the type of content that can be shared (i.e. linked to). Compatibility problems are widespread and create frustration when sharing digital content of a specific media type.

What is needed are advanced techniques for controlling the trading of digital rights so that the buyers are assured of an authentic copy, "fair use" is preserved for the copy, and content owners are fairly compensated. In addition, advanced techniques are employed to provide an easy, friendly, efficient, and adaptable method for users to share digital content.

SUMMARY OF THE INVENTION

The invention relates, in one embodiment, to a method of facilitating a transaction between a merchant and a buyer using a computerized system including a set of titles. The method includes storing the set of titles in a merchant site corresponding to a set of products for sale; browsing the merchant site using a client device and selecting a product for purchase; and generating a payment slip title for the product including information relating to a payment amount and a buyer identifier. The method further includes selecting a payment structure from a set of available payment structures; modifying the payment slip title to include information corresponding to the selected payment structure; releasing the product title to the buyer; and transmitting the payment amount to the merchant.

In another embodiment, the invention relates to a method of facilitating a payment transaction between a buyer and a seller using a computerized system comprising a payment structure, a buyer identifier, and a set of titles including a product title and a payment slip title having a buyer identifier element, a payment amount element, and a payment structure element. The method includes storing a plurality of titles in a merchant memory to create a plurality of stored titles; browsing the merchant memory to select an available product corresponding to the stored titles; and selecting an available title for purchase. The method further includes generating a payment slip title for the product selection including identifying information relating to a payment amount and buyer identifier; transmitting the payment slip title to the title management apparatus; and selecting a payment structure from the set of available payment structures. The method also includes modifying the payment slip title, wherein the payment structure element is indicative of the selected payment structure; transmitting the payment slip title to the payment apparatus; releasing the product title to the buyer; and transmitting the payment amount to the seller.

Advantages of the invention include the ability to conduct secure merchant transactions over a network, such as the Internet.

BRIEF DESCRIPTION OF THE DRAWINGS

The invention is described with reference to the figures, in which:

FIGS. 8A-E depict exemplary title management displays according to an embodiment of the invention;

FIGS. 10A-B depict exemplary administrative user control displays according to an embodiment of the invention;

FIGS. 13A-E depict exemplary title data according to an embodiment of the invention;

DETAILED DESCRIPTION OF THE PREFERRED EMBODIMENT(S)

Figure 1A:
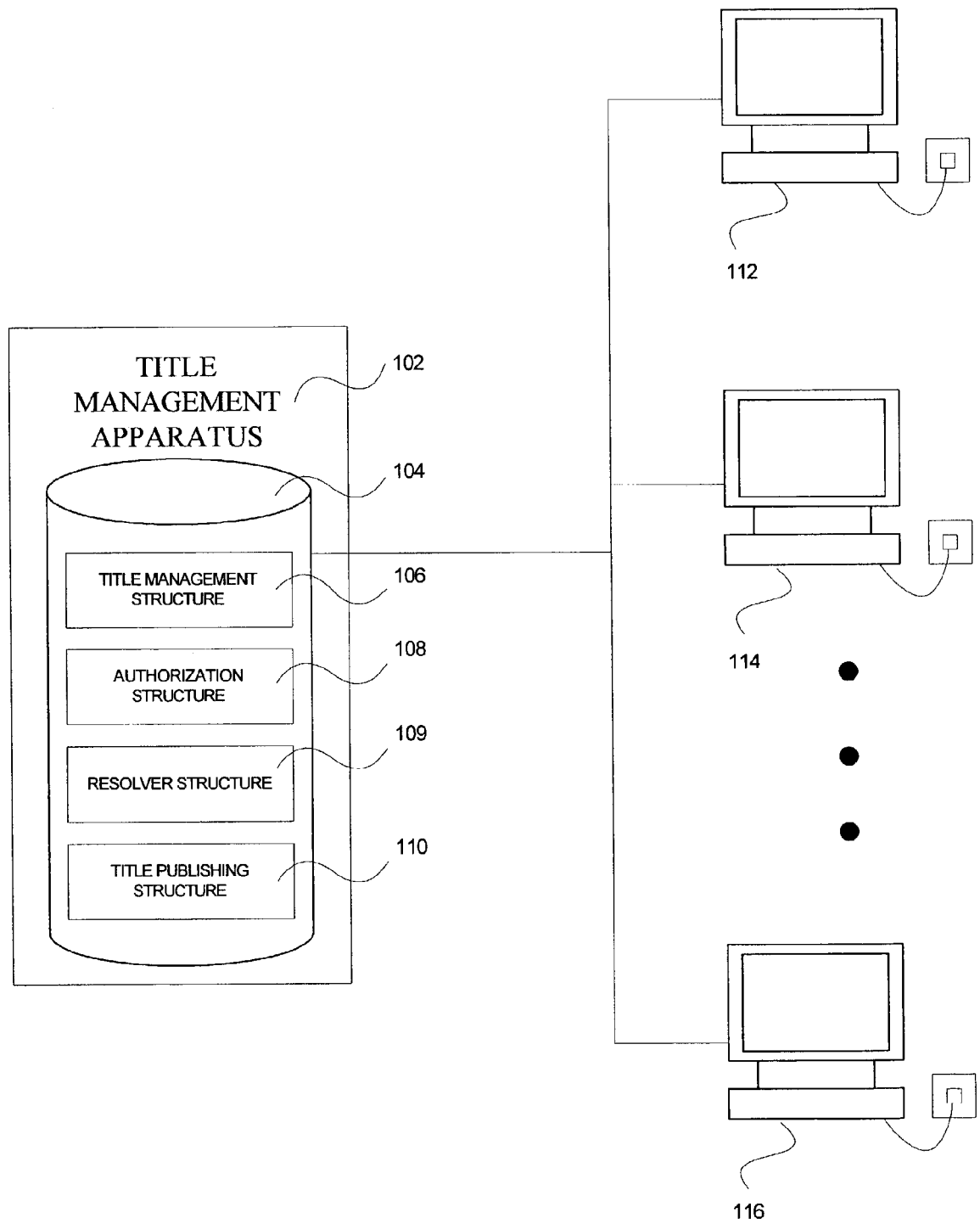
FIGS. 1A-3 depict a computer network and a title management apparatus according to an embodiment of the invention.

The invention is directed to the creation, ownership, exchange, management, reselling, marketing, bartering, and auctioning of titles.

In this context, a title is an object that may have a number of elements and attributes including embedded digital content, ownership attributes, copy permissions, and others as described herein. A title can also represent the rights to a single piece of digital content or a single resource, or it can represent the rights to a multitude of digital content and resources and in a variety of formats. The digital content rights, such as the ability to exchange or copy, are determined by the content publisher. Furthermore, a title can also represent the rights to another title or multitude of titles, which in turn express rights to digital content or resources.

Users can initiate a variety of exchanges with each other depending on the type of title and the rules associated with that title. These exchanges can take the form of trades or transfers. In the case of trades, offers can be reviewed, and then subsequently accepted, canceled, or a counter-offer can be presented. The counter-offer process can continue until satisfaction, or until trade is canceled.

In order to help protect the integrity of the trade, a chained hash cryptographic technique is used to guarantee that only a single instance of the title is in circulation at any one point in time. The title management and publisher structure may perform verification on the chained hash to ensure its integrity. The chained hash technique may be implemented in such a way as to provide benefits typically associated with one-time password and digital cash systems. However this implementation may be modified to provide a high degree of integrity around the use of titles within the ecosystem.

The chained hash technique can be combined with additional controls that work in conjunction with the security classification element to provide varying degrees of security for the title and the digital content referred to by the title. These additional controls may include cryptographic key-splitting techniques as well as multi-user and multi-factor authentication. Security class is an element that resides in the title to convey the level of security appropriate for this title. Security class is set by the publisher based on the publisher's requirements and rules. Security class can be used within the ecosystem to determine appropriate handling of the title. For example, a title with a high-security rating of 5 can force strong authentication of the user as well as strong encryption of the digital content associated with the title. As an example, a multi-user authentication requirement can be used for parental controls, whereby a guardian must also provide authentication (and acceptance) on the purchase and use of a title where a minor is involved.

The content rating system can be used by publishers to determine appropriate ratings for their content, and these ratings can be enforced by title management and resolver apparatus to ensure guardian approval. Content rating is an element within the content element to convey a rating regarding the suitability of the content. The rating system is dependent on the type of content and the regulatory factors involved (e.g. music, video, movie, etc.).

The exchange structure, specification, and rules provide the ability for the title publisher and/or the title owner to determine the exchange capabilities of subsequent owners of the title. For example, a title publisher could limit a title owner to only one trade, or even to deny trades but allow transfers. A title owner may transfer the title to another person for a limited period of time and deny that person any ability to trade or transfer. This ability to set limitations may operate in conjunction with the rules structure.

A trust structure is also implemented to provide users with a simple ability to validate the digital content they receive. The trust structure may convey that the digital content was (if applicable) rightfully issued by the content publisher. Content publishers are not bound to use the trust structure for the titles they issue but in doing so can provide assurances to the buyer.

The invention is described with reference to specific apparatus and embodiments. Those skilled in the art may recognize that the description is for illustration and to provide the best mode of practicing the invention. For example, references are made to computer servers and clients, but in a peer-to-peer network, any computer is capable of acting in either role. Likewise, reference is made to Internet protocol while any substantially comparable data transmission protocol can be used.

A. ARCHITECTURE

FIGS. 1-4 depict a computer network and a title management apparatus according to an embodiment of the invention. In one embodiment, FIG. 1A depicts a title management apparatus 102 resident on a computer 104, comprising a title management structure 106, an authorization structure 108, a resolver structure 109, a title publishing structure 110 and a number of client computers 112-116 all coupled over a network (e.g. Internet), where each of the computers 112-116 may be owned by users of the system.

The users log on to title management apparatus 102 over the network and are authorized to perform certain functions and access certain data based on their ownerships and permissions, in order to manage, resell, market, barter or auction their respective titles. A digital content file stored within a content publishing structure 110 is redeemed through a pointer stored within is respective title. This pointer indicates the location of the digital content file. However, since this location could have changed since the title was created, a resolver structure 109 substitutes the updated digital content file address, if needed.

Redemption can occur in various ways. For example, the digital content file could be downloaded in its entirety, or it could be streamed to one of the client computers 112-116 and then viewed or listened locally. If the digital content file is already stored locally, redemption could allow access or playability. In the case of an online game or chat application, redemption of the digital content file could authorize participation.

Figure 1B:
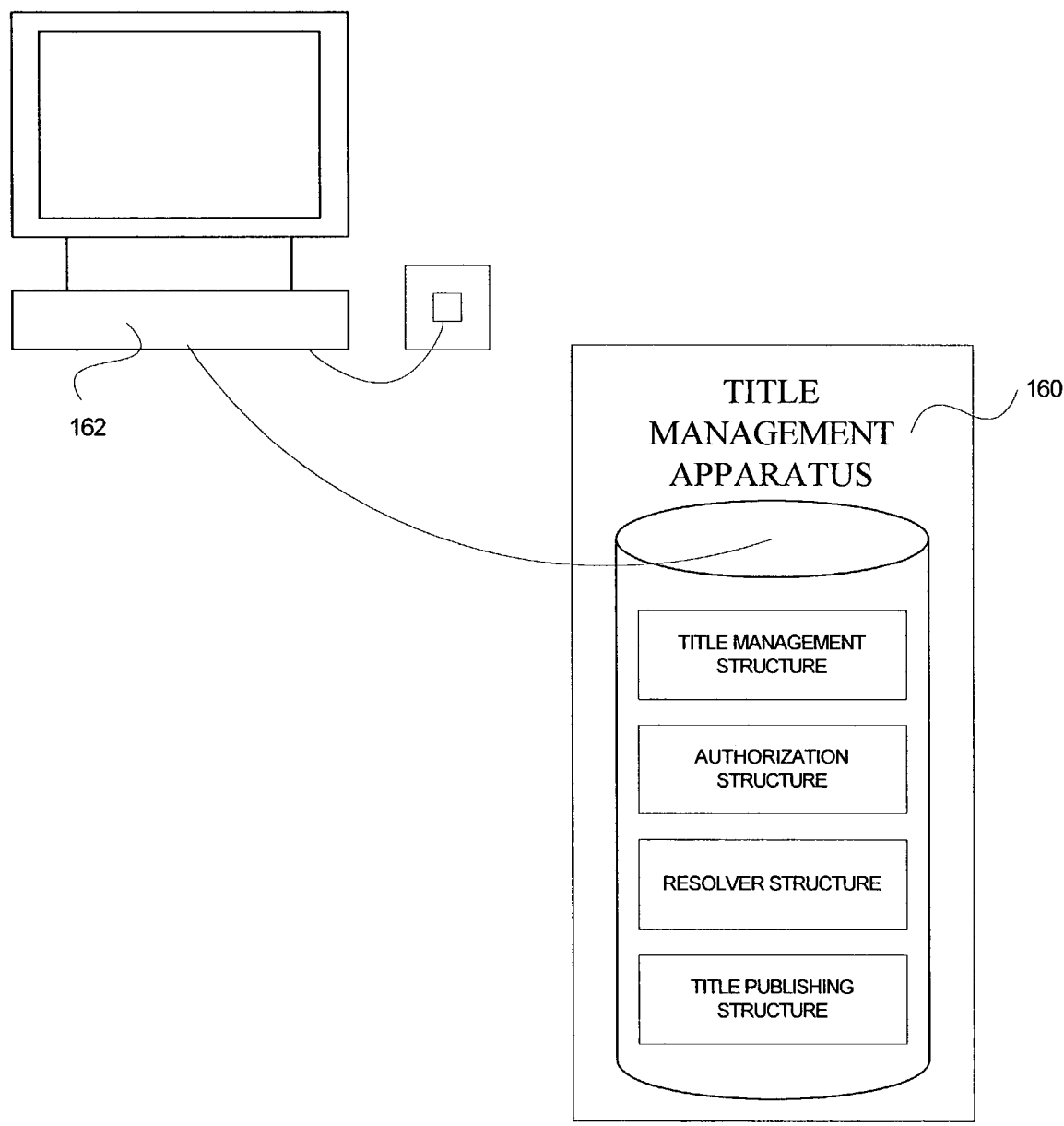

FIG. 1B depicts another embodiment in which the title management apparatus 160 is resident on a client computer 162. A user can log on to title management apparatus 160 directly without network access. As in FIG. 1, the user is authorized to perform certain functions and access certain data based on their ownerships and permissions, in order to manage their respective titles. In this embodiment, redemption of a digital content file only occurs within the memory of client computer 162.

Figure 2A:
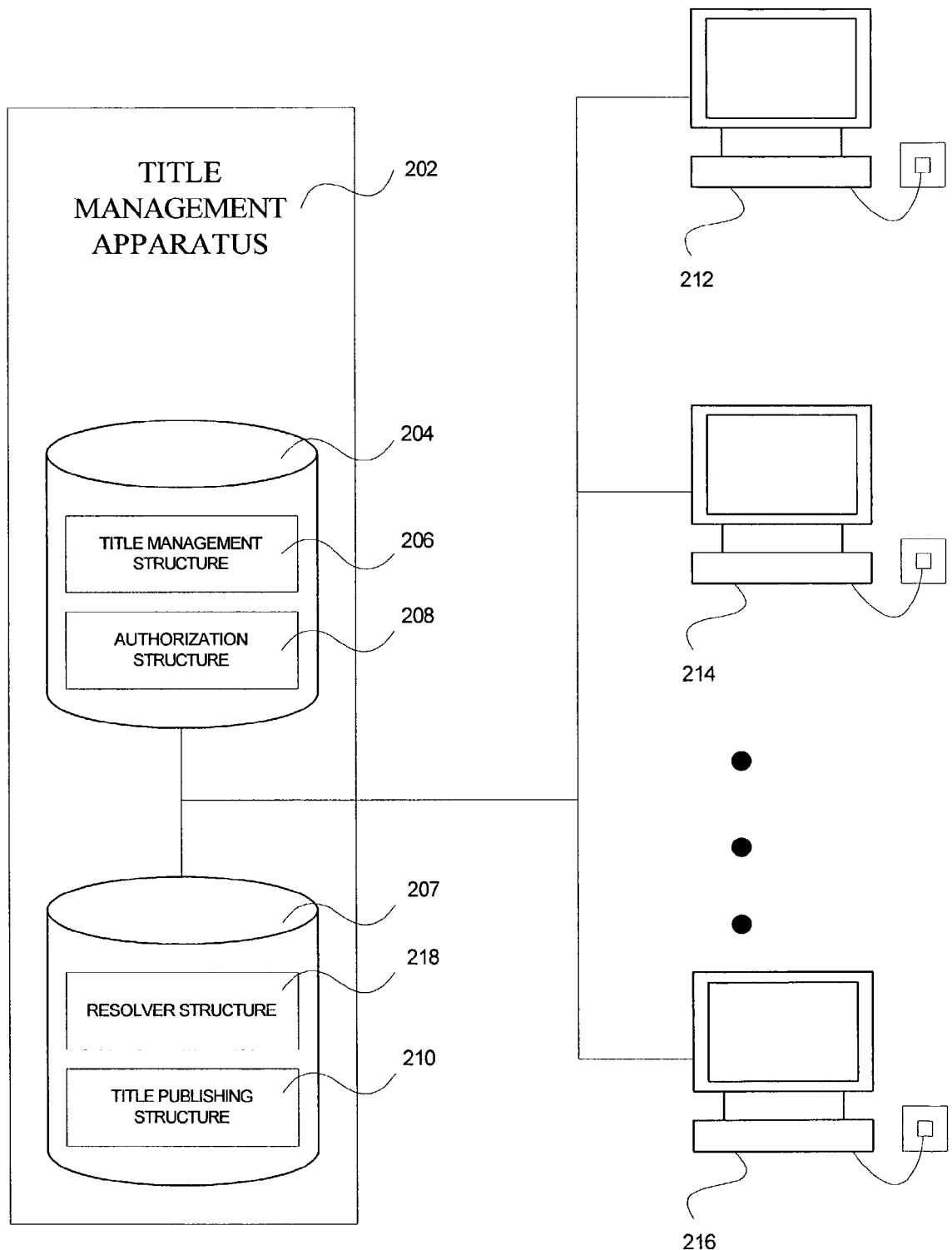

In another embodiment, FIG. 2A depicts a title management apparatus 202, wherein a title management structure 206 and an authorization structure 208 are resident on computer 204, while the content publishing structure 210 and a resolver structure 218 are resident on computer 207. Both computer 204 and computer 207 are coupled over a network to computers 212-216, which may be owned by users of the system. As in FIG. 1A, the users log on to title management apparatus 202 over the network and are authorized to perform certain functions and access certain data based on their ownerships and permissions, in order to manage, resell, market, barter or auction their respective titles.

Figure 2B:
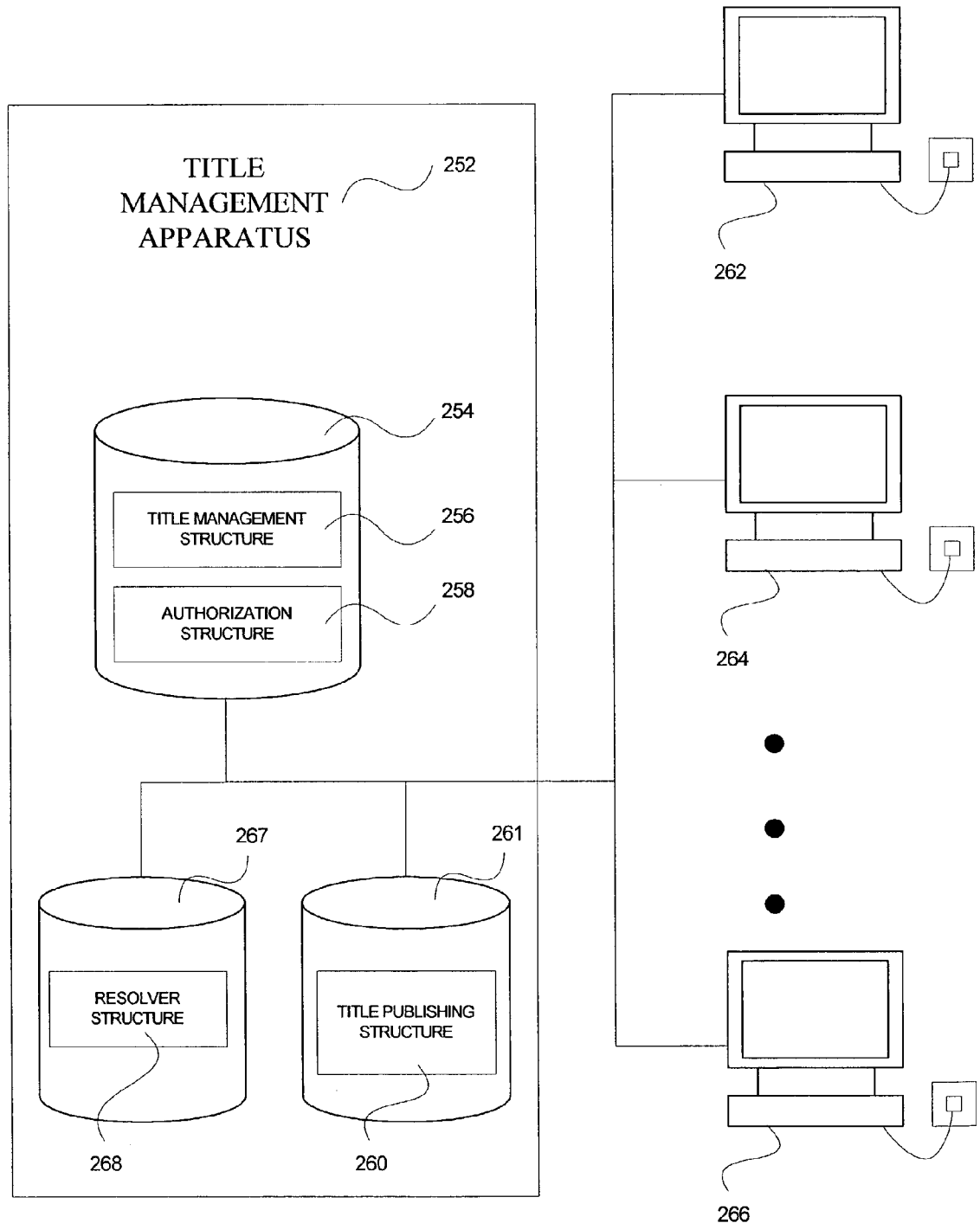

In another embodiment, FIG. 2B depicts a title management apparatus 252, wherein a title management structure 256 and an authorization structure 258 are resident on computer 254, while the resolver structure 268 is resident on computer 267, and the title publishing structure 260 is resident on computer 261. Computers 254 267, 261 are coupled over a network to computers 212-216, which may be owned by users of the system. As in FIG. 1A, the users log on to title management apparatus 252 over the network and are authorized to perform certain functions and access certain data based on their ownerships and permissions, in order to manage, resell, market, barter or auction their respective titles.

Figure 3:
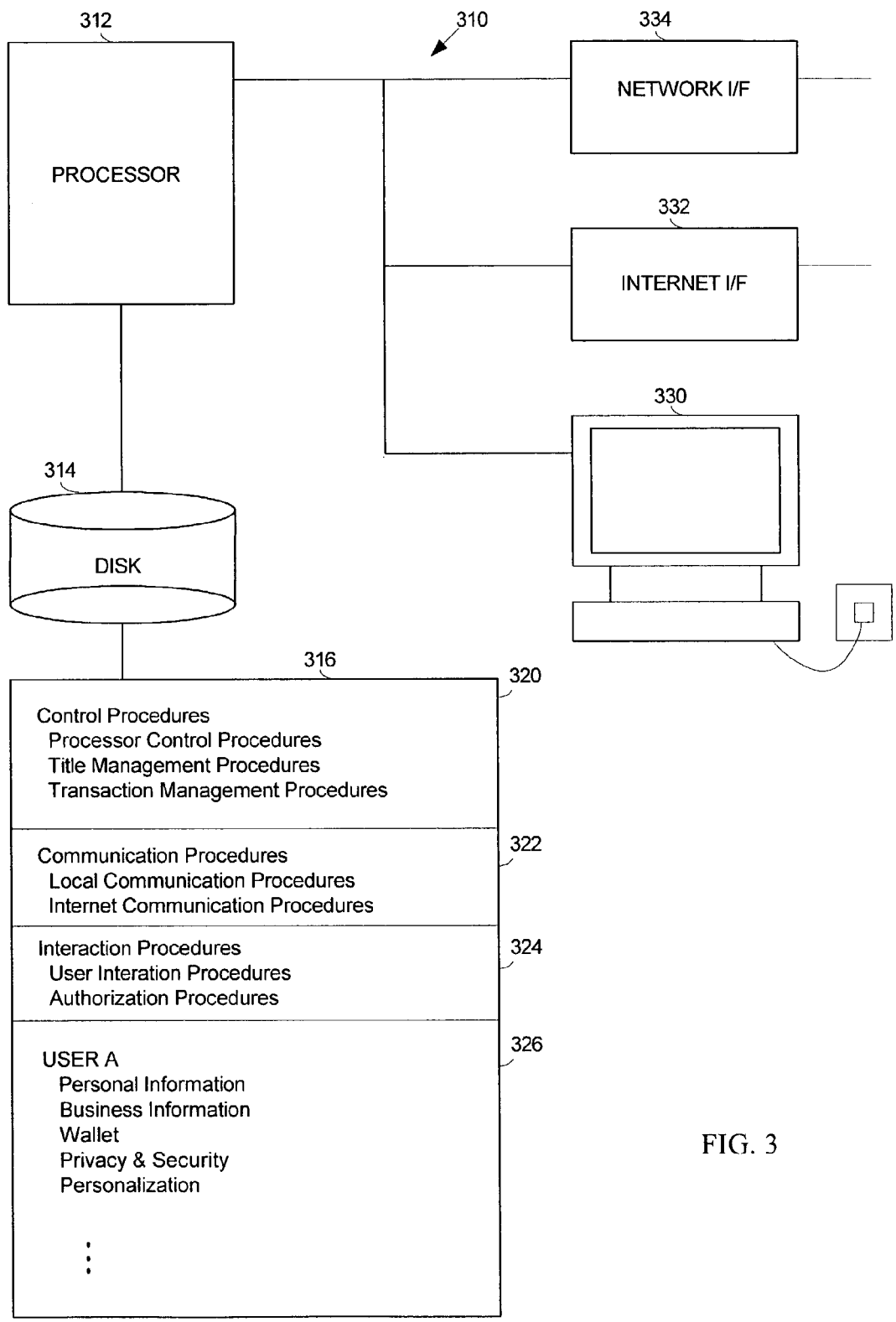

FIG. 3 depicts the computer 310 for performing the invention according to an embodiment of the invention. The computer includes a processor 312 coupled to a memory 314. The memory contains a data structure 316 further comprising a plurality of software structures including control procedures 320, communication procedures 322, interaction procedures 324 and data 326. The processor is further coupled to a user interface 330, an Internet communication interface 332 and a network interface 334.

Figure 4:
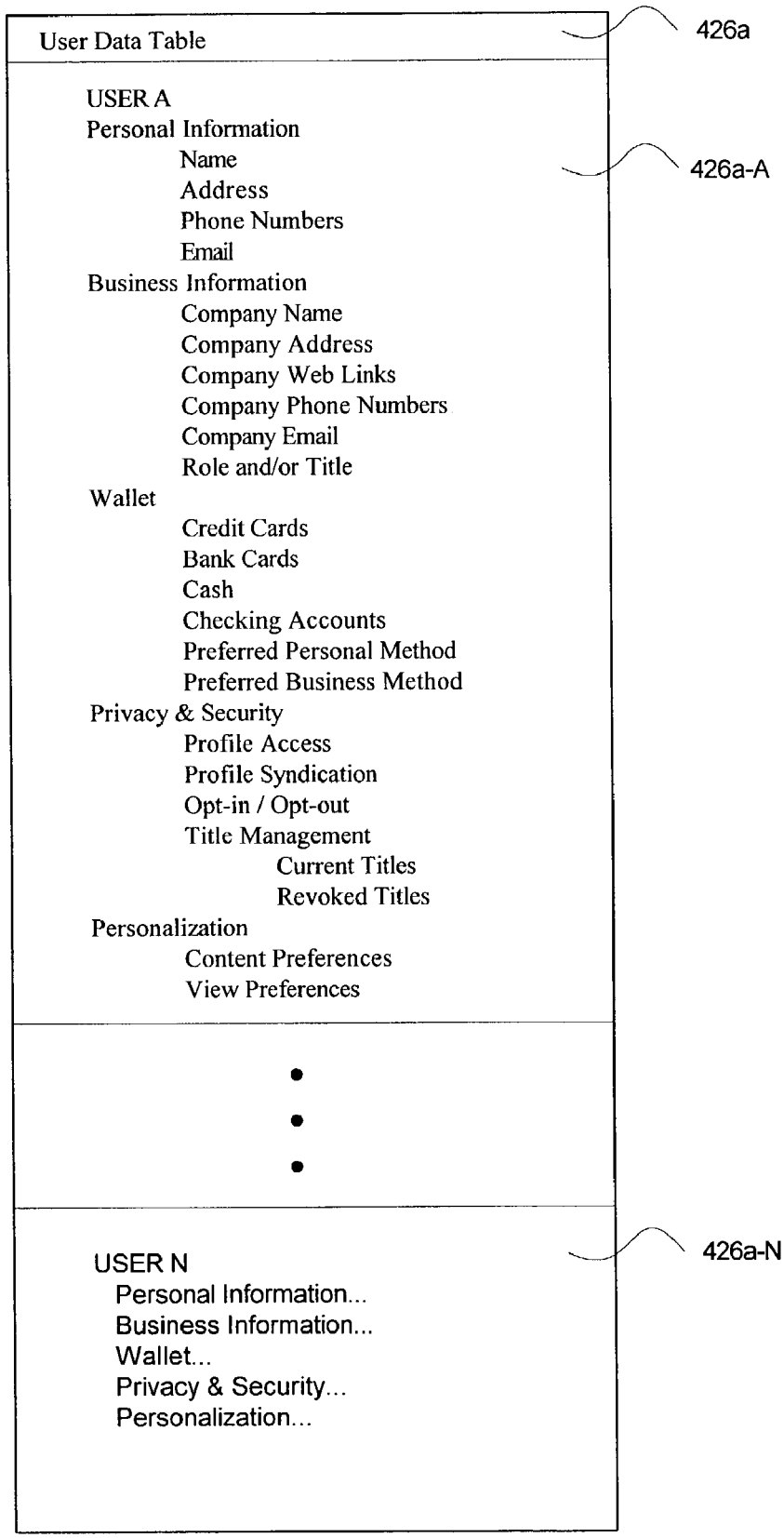
FIG. 4 depicts exemplary user data according to an embodiment of the invention.

FIG. 4 depicts exemplary user data 426a according to an embodiment of the invention. The user data has a number of elements for each user 426a-A to 426a-N, including personal information fields, business information fields, wallet fields, privacy and security fields, and personalization fields. The personalization fields can be set by the user for controlling the user environment, for example, the default color scheme for the graphical user interface, the type of interface skin, and the background image. Profile information maintained on the user can include, for example, the financial information, emergency contact, medical information, and work related information. The user data and profiler are extensible to support the needs of the title transaction system (and the ecosystem).

The title transaction system may provide the ability for users to manage their profile information and to generate titles for accessing profile information. For example, this functionality can be used by someone to easily create a business card title and distribute that title to their associates. The title in this case would be a tag that refers (that is, points) to their "business card" profile elements containing (as an example) their name, title, business address, and business contact information. In an other example, some else could create an emergency profile card and distribute it to specific people so that in an emergency they would have access to certain personal information such as name, medical insurance number, allergies, health risks, and emergency contacts. In this particular case, the title could be a ticket. The title transaction system provides for close integration of profile information to provide significant value add for the user as they participate in a community where communication, purchasing, trading, auctioning, and bartering are common place.

Figure 5:
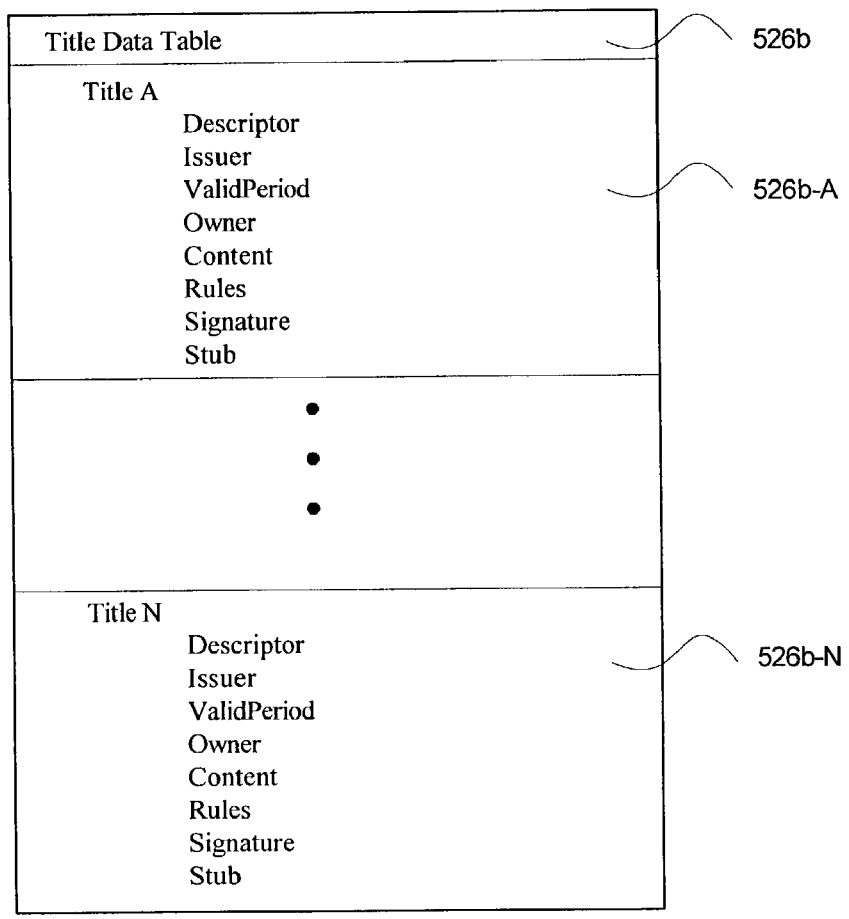
FIG. 5 depicts exemplary title data according to an embodiment of the invention.

FIG. 5 depicts exemplary title data 526b for a title object. The title data has a number of fields for each title including header fields, titleowner fields, content parts fields, titlerules fields, and XMLDSIG fields. The title object can be a type such as a tag, token or ticket.

As depicted in FIG. 5, the title object has at least one stub object associated with it in order to verify the integrity and valid instance of the title. In addition to identifiers, the stub object may contain security indicia, such as the indicia required by the chained hash technique, in order to validate the single instance and valid ownership of the title. This stub object may change state on every redemption, exchange, and revocation of the title.

The title object may have more than one stub object associated with it in order to convey additional information, controls, content, or other value-add not explicitly given in the original title. The stub object provides extensibility to the title without requiring a complete replacement to the title object. As an example, a value-add reseller such as a retail merchant may attach additional content or value to the original title in order to promote their product or even to make the original title more attractive for sale or trade. In another example, an additional control stub maybe attached to the original title in order to ensure appropriate handling of the title for use by minors, such as ensuring that only an edited version of the content is viewed. The use of the stub object is flexible to ensure extensibility of the title object.

As depicted in FIG. 5, the stub object can contain a digital signature element in order to verify the integrity of the stub. Although the stub is viewed as an extension to the title, the stub can be digitally signed by any participant in the ecosystem. This permits a flexible architecture where multiple participants can collaborate on adding value to a title object.

The system employs a set of specification and rules for structuring, creating, managing, handling and using titles. The specification and rules, as well as the format of the title, are extensible to support the needs of both the user and content publisher, as well as the needs of intermediary systems within the ecosystem that handle (or interact) with titles.

In the exemplary embodiment, a tag is a title object that can be copied among users, a token is a title object that cannot be copied like a tag, but can be transferred or exchanged between users, and a ticket is a title object that is issued to a specific user, and hence cannot be copied or transferred among users.

B. LOGICAL STRUCTURE AND OPERATION

Figure 6:
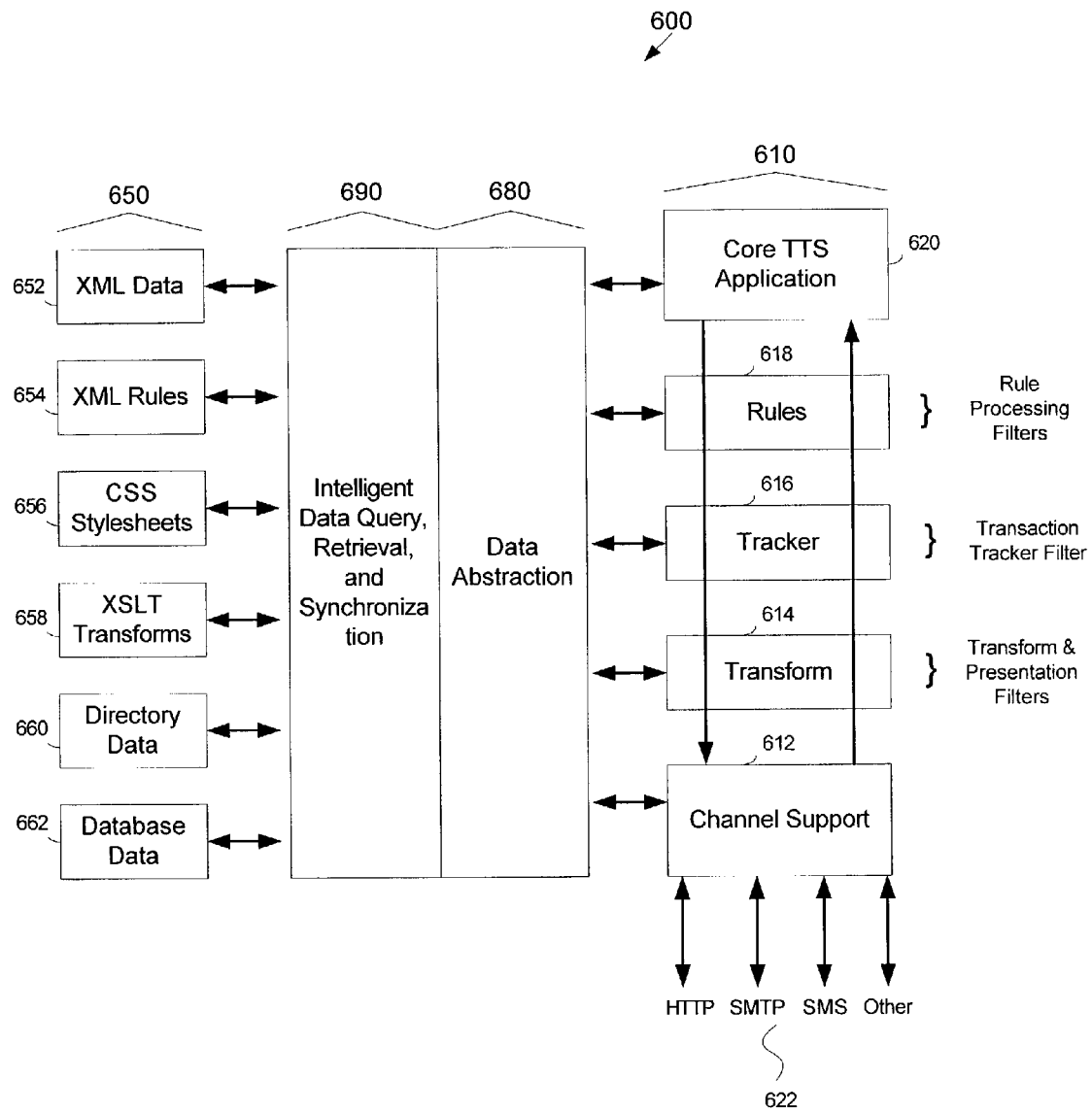
FIG. 6 depicts a logical structure of the invention according to an embodiment of the invention.

FIG. 6 depicts a logical structure 600 of the invention according to an embodiment of the invention. The primary parts of the logical structure are the processing portion 610, the data portion 650 and the data abstraction portion 680. As shown, the processing portion 610 communicates with the data portion 650 through the data abstraction portion 680. FIG. 6 represents the primary model for implementation and deployment of the title transaction system, however the design is intended to be modular in that components can be eliminated or modified as required by the environment and requirements. The implementation of the title transaction system can take many shapes and forms. For example, this model maybe modified to permit operation of certain TTS components within a limited resource computing device such as a mobile phone. In another example, a fixed implementation may eliminate certain abstractions when knowingly operating in a static environment with a limited set of titles. In another embodiment, the TTS comprises sub-systems within other applications to support titles and transactions (i.e., media players such as Microsoft Media Player and Winamp, Microsoft Outlook, etc.)

A channel support structure 612 is responsible for communicating with users and is associated with the communication procedures 622. The channel support 612 communicates over the network using a number of possible protocols including HTTP (hyper-text transfer protocol), SMTP (simple mail transfer protocol), SMS (short messaging service) and others.

The title protocol may define a standard set of protocol bindings to describe how title transactions are communicated across those protocols. However the title protocol specification may define extensions so that the title protocol can be bound to other [underlying] protocols as required within the ecosystem. When an inbound message is received by the channel support 612, the message is passed along to a number of other structures that decode, transform and interact with the message. For example a transform structure 614 performs a transform on the inbound data request to conform it to a normalized application interface for a core title transaction application. The use of the transform layer at this point provides standardized parsing of the transaction as it proceeds through the pipeline to the core title transaction application. A tracker 616 acts as a transaction filter to maintain a log of all the inbound messages and requests. A rule structure 618 then applies a number of possible rules to the message. The rule structure obtains its rule sets from several sources including the title itself (as defined in the title format), data storage through the data abstraction portion, and extensions that can support the retrieval of rules through other sources such as via the network. The rules include characteristics for each title, for example, whether it can be refunded, exchanged, played viewed, etc. Often, the functions that can be performed on a given title are related to the title type. For example, in the exemplary embodiment, titles of type tag can be freely distributed to all users, titles of type ticket are tied to a specific user and cannot be exchanged, and titles of type token can be exchanged with other users. When a title of type token is exchanged with another user, the user can no longer redeem that title, and the system may disable any offline content associated with the title.

For instance, the content element within a title can contain an encrypted password that is not known to the user. A program for viewing or playing the offline content, such as Windows Media Player, would read the title through an application program interface, check the rule sets, and then execute content, such as an MP3 file, using the encrypted password. Once a user exchanges the title with another user, the rule sets would be modified to reflect that that the user no longer has rights to the content, and the content itself could not be played or viewed.

The rules associated to the title are developed and applied by the content publisher and by the user (or someone acting on behalf of the user). The title management and title publisher modules may provide an application and interface to easily develop and apply rules to the titles. For example, a content publisher may apply usage rule applicable to the title and the digital content and/or resource it provides evidence of rights to. In turn, a user may apply default rules within the title management module to assist in controlling and protecting their actions related to certain titles (for example, to prevent from accidentally trading a valuable title). In another example, a parent may establish restrictions on the type of content their child may access and use in their title management module.

Specialized rules, called triggers, may also be used. Triggers are rules that invoke actions that are external to the title management apparatus. For instance, a parent can be notified by email that a child wishes to redeem a digital content file for which there is some age restriction.

Specialized rules, called timers, may also be used. Timers are rules that invoke actions based on a specific time or based on a spent amount of time. For example a title may only be good for twenty four hours, or an exchange may only be valid for one week. Timers maybe combined with triggers in rule processing.

The core title transaction application 620 (core TTS) is the application that verifies the ownership of the titles by the users and that authenticates the titles and selectively permits the titles to be transferred if such rights are allowed. Among the modules contained within the core TTS application are the following:

(a) A title manager module performs management functions on titles such as organizing, deleting, adding, transferring, trading, copying, backing up, viewing, and redeeming. In addition to basic title functionality, the title manager module can provide sophisticated and value-add features to allow the user a better online experience such as chat where real-time redemption and trading are available during the chat session. Furthermore, features such as sorting categorizing, searching and notify can be made available to the user. As an example, a sophisticated search capability can be implemented whereby the user can search the network for other users, titles available for bid, transaction makers, or even a secure and trusted third party lockbox with which to conduct a trade. This sophisticated discovery process may be an integral part of the TTS ecosystem. The title manager module is the primary application component that the user may interact with on a regular basis. The title manager module maybe designed to be a single-user or multi-user application depending on the specific use of the module. A single-user version can be used in a peer-to-peer network, whereas a multi-user version can be deployed with consumer aggregators. The title manager implements a lockbox feature that is responsible for securely executing trades between two parties. The lockbox provides storage for titles being traded and provides a secure environment where users can verify trades, view samples, and accept a trade. Upon acceptance of the trade by all parties involved, the lockbox may execute the trade and provide each party with an updated title and stub object-pair that evidences their new rights. The lockbox feature of the title manager can be implemented as a standalone service so that a trusted third party can provide secure execution of trades.

(b) A transaction tracker module performs the basic task of tracking all inbound and outbound transactions whether successful or not. The tracker module is configurable by the user to determine the level of tracking to be performed based on the user's requirements. The tracker may be used to provide a record of all transactions performed by the user such as trades and transfers. The tracker may be used by all core TTS components for creating a record of all transactions (for example, those performed by the resolver and content publisher). The tracker may record transactions in a data repository using the data abstraction portion.

(c) A rules builder module performs the task of building rules to be associated with the titles and processing of the titles. The rules builder module may provide an easy to use interface for the user to create and build rules that can be embedded within a title or used during the processing of a title. Rules that are not embedded within a title may be stored in a data repository using the data abstraction portion. The rules builder may provide an extension capability to apply rules developed external to the rules builder ensuring the adaptability of title processing.

(d) A title resolver module that the important task of resolving all titles presented. This process involves all applicable tasks [to the title presented] including verifying integrity of the title, validating the title, ensuring ownership of the title, decoding and decrypting the necessary title elements and retrieving the content or resource requested. The title resolver may be responsible for executing and acting upon rules and triggers that are applicable to the title presented. An additional function of the resolver would be to refresh old titles. For example, if information contained within a title became outdated, this information could be automatically refreshed either by replacing the title completely or by adding a new stub object that updates the information. In addition, the title resolver may invoke additional processes as required such as the CODEC module.

(e) A state server module that maintains and verifies state associated with the use of titles throughout the ecosystem. The state server may work in conjunction with the title resolver in order to verify the validity of the title and generate new stub objects associated with the title on every redemption and exchange. The state server may be a high-capacity, high-availability, and high-performance system that can be widely distributed and chained in order to perform fast validation for titles in use. The state server may perform functions and algorithms associated with the chained hash, one-time password, and key-splitting techniques.

(f) A title publisher module performs the tasks associated with publishing (that is, creating new titles). The title publisher provides an easy to use interface for a user to identify, organize, and group new content (or resources), and then generate a new title or title template that points to that digital content or those resources. Titles can be generated on the fly and immediately by the title publisher which would then invoke the title manager to store the newly generated titles. Alternatively, the title publisher can generate new title templates that would describe the contents of the title but would not immediately generate a title. Title templates could be used in a variety of ways by the content publisher, for example by the content publisher's online shopping site to automatically generate titles when a buyer purchases new content. The content publisher stores work in progress (such as grouped publishing efforts) in a data repository using the data abstraction portion. Title publishers may provide sophisticated functionality to enhance the online experience for content publishers such as organizing content and title publishing into projects, sharing projects, and allowing community projects. Workgroup and workflow capabilities can be built into the title publisher as well as creating single-user and multi-user versions. As an example, a multi-user version can be implemented by a consumer aggregator or service provider in order to perform title publishing activities on behalf of a user community. Enhanced features may provide additional value to people using the title publisher such as verifying pointers to content files and resources, automatically obtaining icons, and even pushing titles and content out to servers.

(g) A rating system module performs rating tasks on transaction records to support billing requirements. The rating system may be flexible to support the variety of billing options required within the ecosystem. The rating system may act on transaction data but may maintain separation between the data sets to ensure integrity of the transaction log.

(h) A CODEC module performs coding and decoding functions on the content retrieved by the title resolver. The primary purpose of this module is to encapsulate content in a secure package as determined by the security required of the title and established by the rules. For example, this module can perform digital watermarking of music and image content, and it can also be used to encrypt the content in a traditional digital rights management package. Additionally, the CODEC can be used by the resolver to decode contents within the title before processing by the resolver. The CODEC may provide mechanisms to support these functions as required within the ecosystem.

(i) A billing interface module provides an interface to the billing system operated by the user [or entity] running any of the core TTS components or modules.

(j) A transaction viewer module provides an interface for the user to view transactions recorded by the transaction tracker.

(k) A content interface module performs the tasks associated with retrieving the content. This module may generally be invoked by the resolver. The content interface module may be extensible to support a variety of content and resource systems in use by content publishers.

(l) A synch & replication module performs synchronization and replication across components and modules within the TTS system. This is required for a number of functions including (but not limited to) synchronization and replication of transaction log entries, synchronization of titles across title management modules in a highly distributed environment, and replication of title databases to support redundancy and high-availability.

(m) A crypto interface module performs symmetric and asymmetric cryptographic functions as required within the TTS ecosystem.

(n) An authentication and authorization module performs the type authentication and authorization required by (and specified by) the title or other ecosystem configurations. Authentication may not be required in certain instances, or can be as simple as providing an identifier for "free" use. Strong authentication may be required for other instances and may be enforced by the ecosystem components. Strong authentication can take the form of two-factor such as Smartcard and PIN, or via mobile phone using a SIM card and a PIN, or via any other supported method such as a SecurID token card. In basic form, authentication may be a username and password. Authorization may provide fine-grained access control to core TTS applications as well as to use titles within the ecosystem. Authorization may be based on rules established within titles and configured as part of the implementation of core TTS applications.
(o) A payment interface module provides an interface to a payment system operated by a user or entity of the core TTS components and modules. This permits real-time and batch processing of payment requests as configured by the user or entity.
(p) A cache management module performs basic caching functions of the content or resources retrieved by the title system. This function may provide performance benefits using cached content versus retrieving new content on every request for the same content.
(q) A user registration module performs registration of new users into the core TTS components and modules. This may be used to establish new users in a single user environment such as peer-to-peer, as well as establish new users in a multi-user environment such as that hosted by a consumer aggregator. A consumer aggregator is an entity that provides services to a consumer base (i.e., ISP, mobile operator, etc.).
(r) A transaction maker module performs transaction maker functions such as operating an exchange for the sale of titles, perform licensing of content represented by the titles, maintaining a book of trades, closing and clearing trade transactions, and performing additional value add as determined by the market.
(s) An intelligent data retrieval and query module integrated with the data abstraction portion in order to perform intelligent searches and queries on a variety of data in a variety of disparate locations. The IDRQ module can combine, map, and match data before presenting it to requesting applications through the data abstraction portion. Persistence and caching can be developed into the IDRQ module to enhance performance on multiple and frequent queries/searches.
(t) A web crawler module performs searches on the web to catalog content and provide a mechanism to automatically generate titles that represent the content that has been discovered. The web crawler module can be used statically or dynamically executed based on configuration of the implementation and/or on inbound requests. The web crawler module could interface with the intelligent data retrieval and query system attached to the data abstraction layer for intelligent searches and retrieval of web content.
(u) A discovery mechanism that can be used by all appropriate modules for discovering TTS resources that may be available on the network. The discovery mechanism may allow TTS modules to participate in a peer-to-peer environment as well as collaborate on activities. The discovery process can ensure that trust third parties are available for conducting secure transactions and well as simplifying the user and content publisher experience for clearing titles through the ecosystem.

In the outbound stream from the core TTS, the rules structure 618 then performs certain functions on the outbound information according to rules stored in the data 650 and/or embedded in the title. The tracker 616 checks to ensure that the outbound information matches the inbound requests so that no inbound messages are dropped or ignored and that outbound message are responding to legitimate inbound messages. The tracker may log transactions in accordance with the configuration. The transform 614 converts the outbound information from a normalized format into a format that conforms to a user profile or preference, as well as based on incoming requests for particular transforms. For example, the data can be transformed into WML for display on a WAP enabled phone, or into HTML for display on a web browser. Certain transforms can be executed based on rules established within the system. The profile or preference data as well as the transform templates are retrieved from the data portion 650 in order to perform the transform. Finally, the channel support 612 communicates with the user of the network in a native protocol format.

Figure 7:
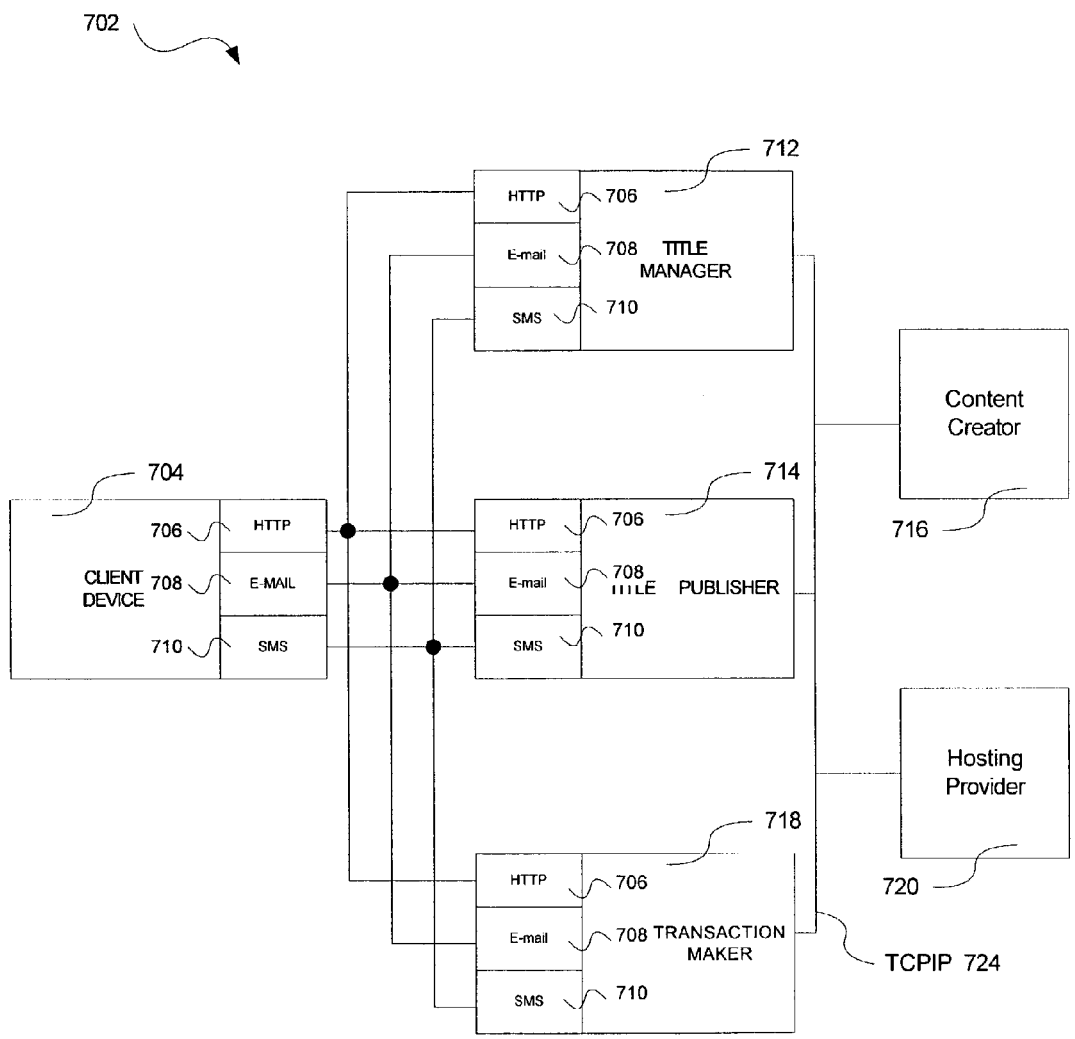
FIG. 7 depicts a logical structure of the invention as deployed in an ecosystem according to an embodiment of the invention.

In another embodiment, FIG. 7 depicts a logical structure of the invention as deployed in an ecosystem according to an embodiment of the invention. The ecosystem 702 is comprised of a number of entities, each providing a service of benefit to the overall system, and each connected to the other using some type of network protocol.

The title manager 712, content publisher 714, transaction maker 718, content creator 716, and hosting provider 720 are coupled to each other using a network protocol 724 such as TCPIP over the Internet. The client device 704 can be coupled to title manager 712, content publisher 714 and transaction maker 718 using any one of a number of network protocols. Among these are HTTP 706, E-Mail (SMTP) 708, and SMS 710.

Figure 8A:
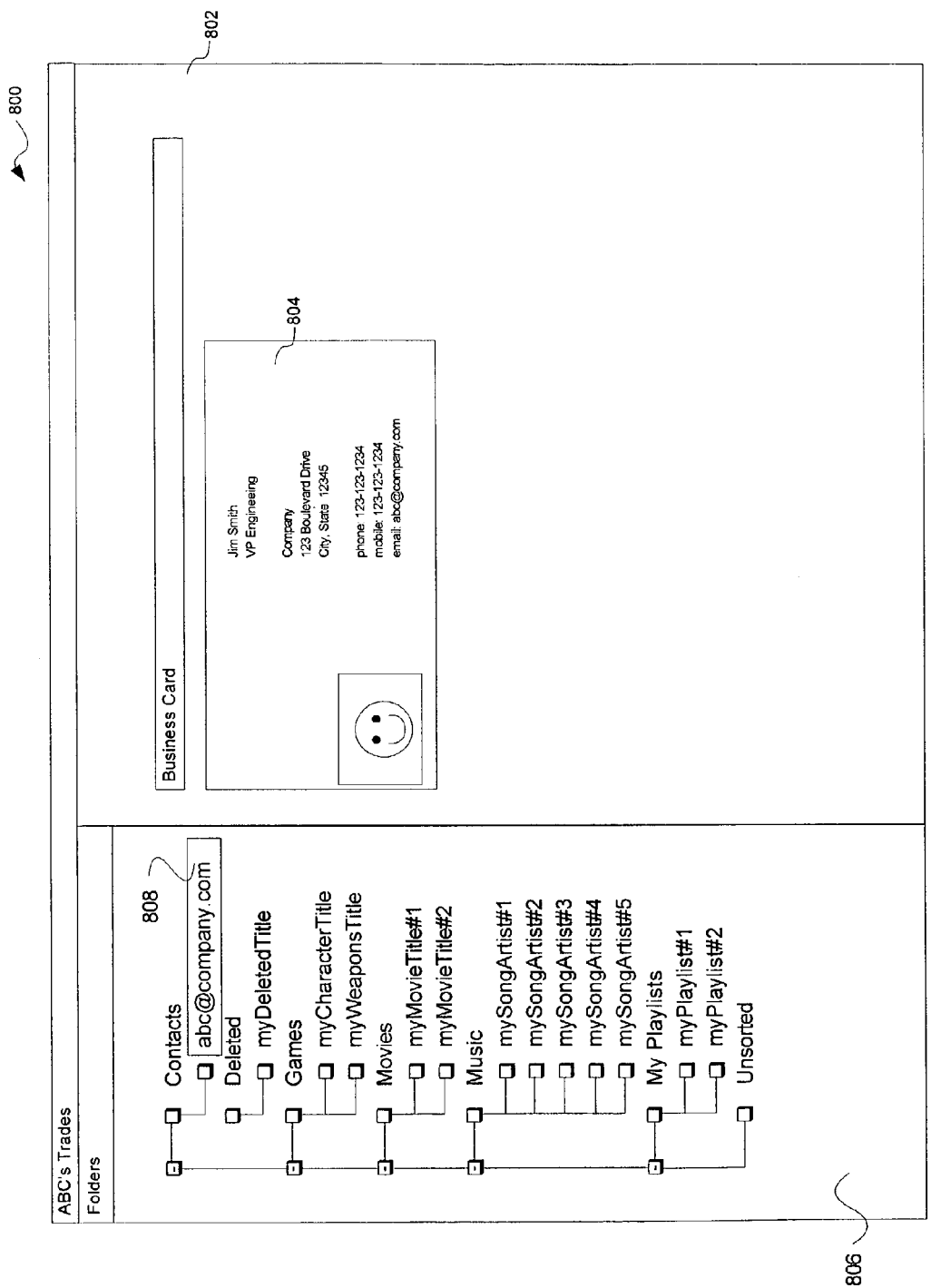

Initially, the content creator 716 creates a digital content file, such as an MP3 song, as well as a title associated with the digital content file. The creating user interacts with a display as shown in FIG. 8A and described in detail below. The digital content file is transmitted across the network protocol 724 to hosting provider 720, where it is stored until a content publisher 714 desires to make it available to users with a client device 704. The content creator also transmits the title to the title manager 712 using network protocol 724.

Users desiring the digital content file may access the transaction maker 718 using the client device 704. Transaction maker 718 functions as a marketplace where digital content buyers and sellers can transact with each other in a secure environment. When a user agrees to buy the digital content file from a seller, in this case the content publisher 714, the transaction maker 718 communicates this to the title manager 712, which in turn, modifies the title of the digital content file with the new rights just purchased by the user. The user can now redeem the digital content file from the content publisher 714 and download it to the client device 704.

If the user desires to transfer the title to a new user, and the title's security indicia allows it, the user can become a digital content seller and post an offer to transfer the title on transaction maker 718. As before, when a new user agrees to buy the digital content file from the user, the transaction maker 718 communicates this to the title manager 712, which in turn, modifies the title of the digital content file with the new rights just purchased by the new user. The buyer can now redeem the digital content file from the content publisher 714 and download it to the client device 704. The seller can no longer access the digital content file on the content publisher 714.

FIG. 8A depicts an exemplary title management screen display 800 according to an embodiment of the invention. This display is used by a user to perform certain functions and access certain data based on their ownerships and permissions, in order to manage, resell, market, barter or auction their respective titles. The display is divided into two sections, a title folder pane 806 and a title content pane 802. The title folder pane 806 can further organize the titles into folders based on different attributes, such as the type of digital content, such as contacts, games, movies, music, playlists, and unsorted. Furthermore, deleted titles are placed a deleted folder. The title content pane 802 displays more detailed information about the digital content. In this example, the user selected title abc@company.com 808 in the title folder pane 806, and is displayed the corresponding business card 804 for a contact "Jim Smith."

Figure 8B:
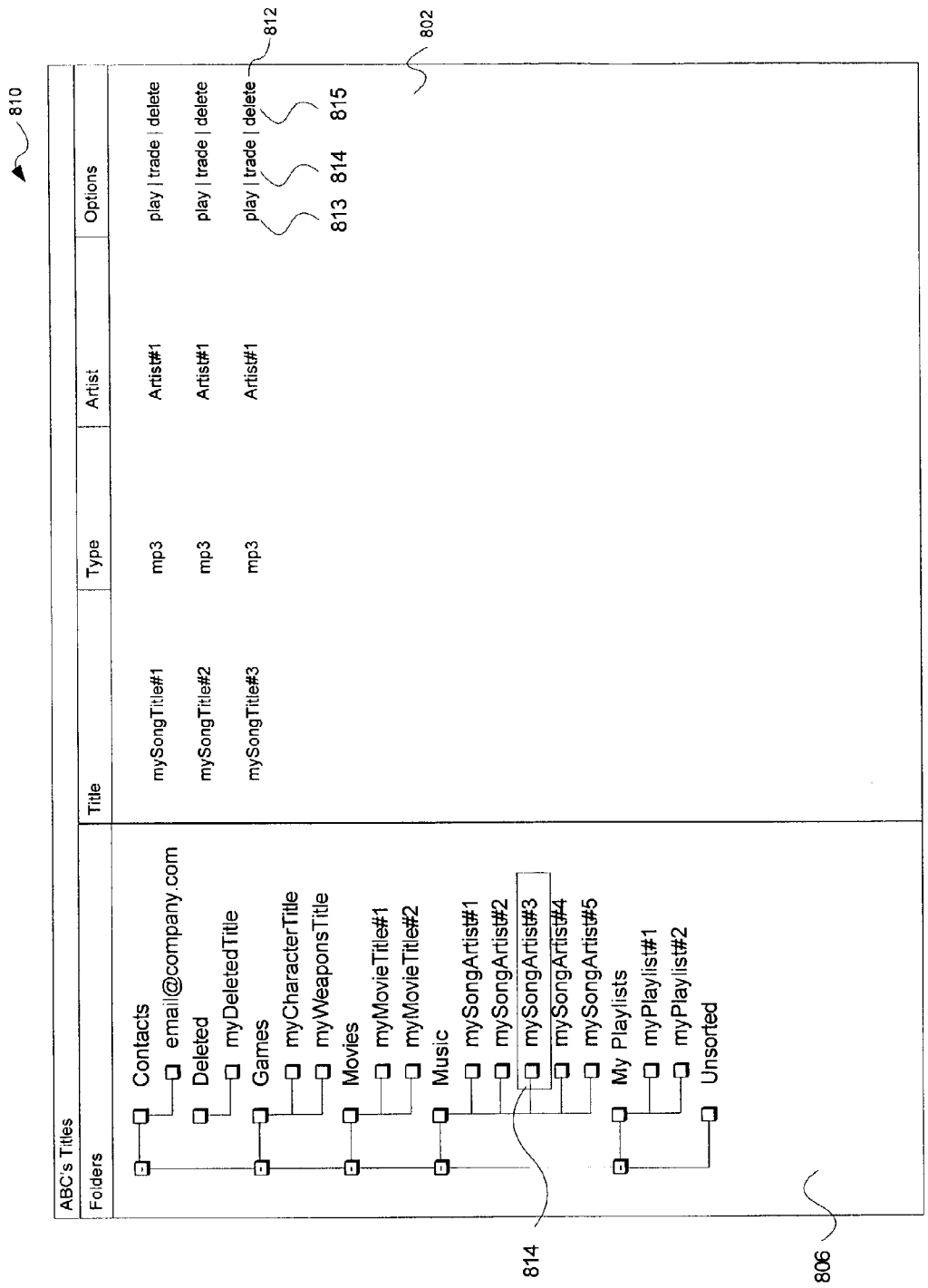

FIG. 8B depicts an exemplary title management screen display 810 according to another embodiment of the invention. As in FIG. 8A, the display is divided into two sections, a title folder pane 806 and a title content pane 802. Each title entry 812 in the title content pane 802 may have a play user selectable button 813, a trade user selectable button 814, and a delete user selectable button 815.

In this example, the user selected mySongArtist#3 814 in the title folder pane 806, and is displayed the owned titles to mySongArtist#3 songs 812. From this display, the user has the option to play 813 the song on the user's client computer, trade 814 the title to the song to another user, or delete 815 the title altogether.

Figure 8C:
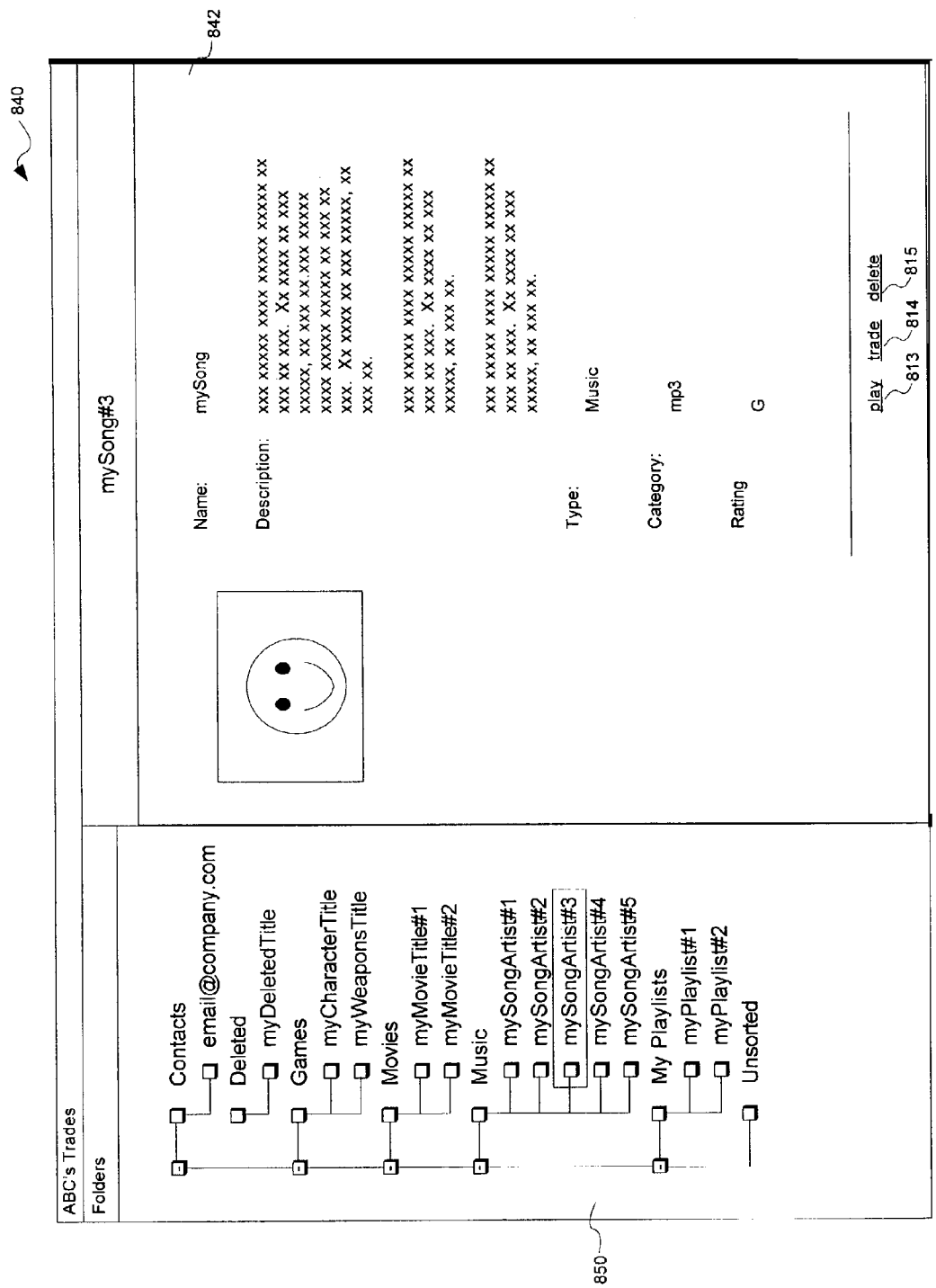

If the user selects one of mySongArtist#3 songs 812, a more detailed title content pane 842 appears, as shown in FIG. 8C. In this pane, a description of the song is displayed, along with the music type, category, and rating. A picture, such as an album cover, can be also displayed. As is FIG. 8B, the user has the option to play 813 the song on the user's client computer, trade 814 the title to the song to another user, or delete 815 the title altogether.

Figure 8D:
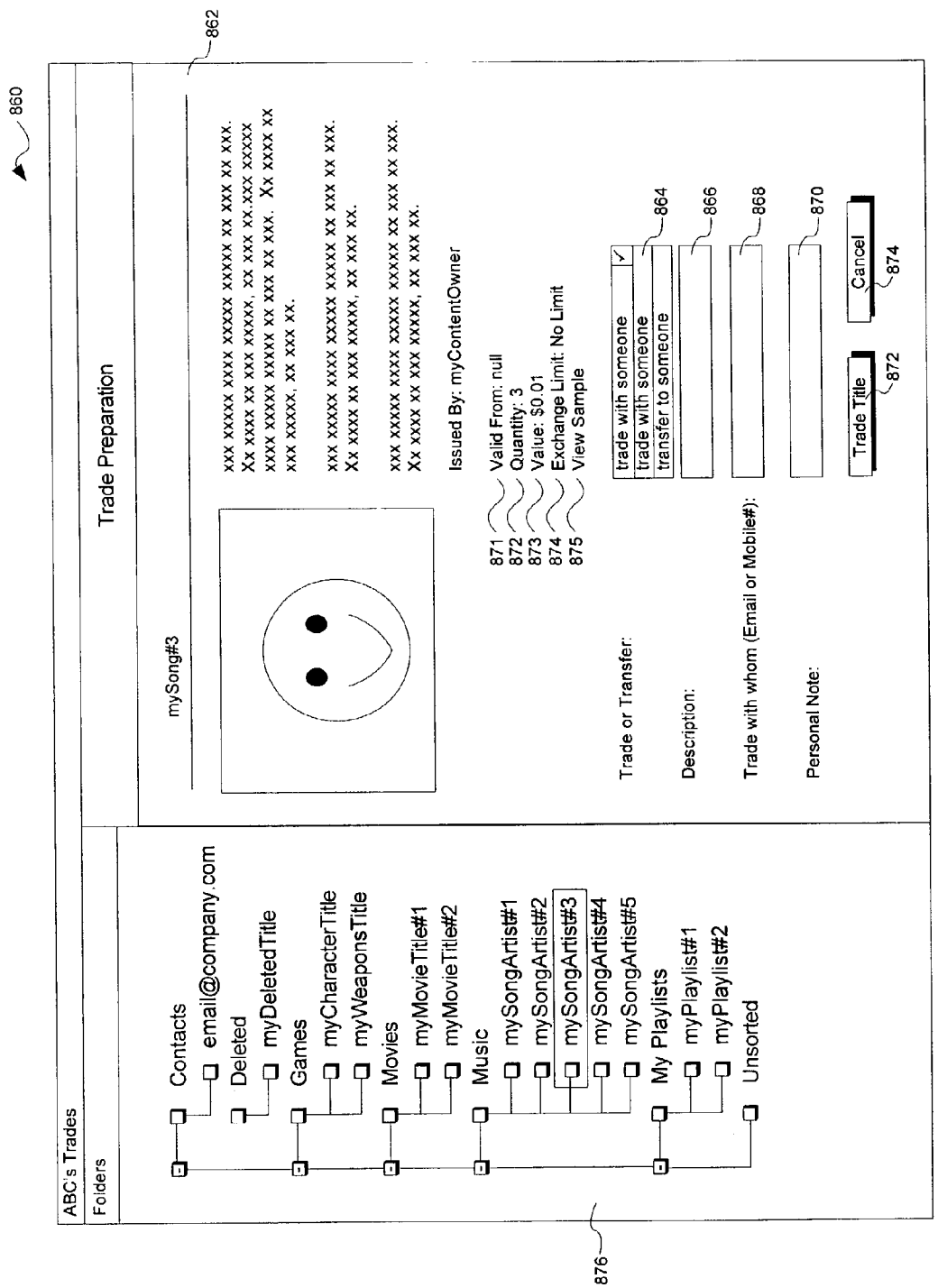

For example, if the user chooses to trade 814 mySong#3, a trade Preparation pane 862 appears, as shown in FIG. 8D. Aside from the information that was previously displayed in the title content pane 842 of FIG. 8C, additional information is displayed, such as a valid from date field 871, a quantity field 872, a value field 873, and an exchange limit field 874. The user can also view a sample 875 of mySong#3.

The user must select whether to trade or transfer 864 the title of mySong#3 with another user. Additionally, the user may be asked if they would like to list it on a barter site ("list on barter site") or post it to a transaction maker site ("post to transaction maker"). The user can enter description of the mySong#3 in the description field 866, as well as a note in the Personal Note field 870 to the user with whom the trade is being transacted. In the trade with whom field 868, the user enters the e-mail or mobile phone number of the user with whom they wish to trade. Once this information is substantially complete, the user selects the user selectable button trade title 872 to proceed, or the user selectable button cancel 874 to cancel the transaction.

The e-mail and mobile phone numbers are used to provide examples of identifying trading parties. The title transaction system has been designed with a flexible and extensible title format to accept and support a variety of naming schemes, including [but not limited to] domain name, phone numbers, X.500 naming, and LDAP.

FIG. 8E depicts an exemplary title trades screen display 880 according to another embodiment of the invention. This display shows the current status of a user's title transactions. The display is divided into five sections, a title folder pane 890 a title status summary pane 882, a title bid pane 888, and a title offered pane 884, and an action pane with a series of user selectable buttons: counteroffer 891, cancel 892, and trade 846. In this example, the user selected mySong#3 883 was offered to trader#2, who has been notified. Once trader#2 makes an offer for trade, the user can counteroffer 891, cancel 892, or trade 846 and complete the transaction.

Figure 9A:
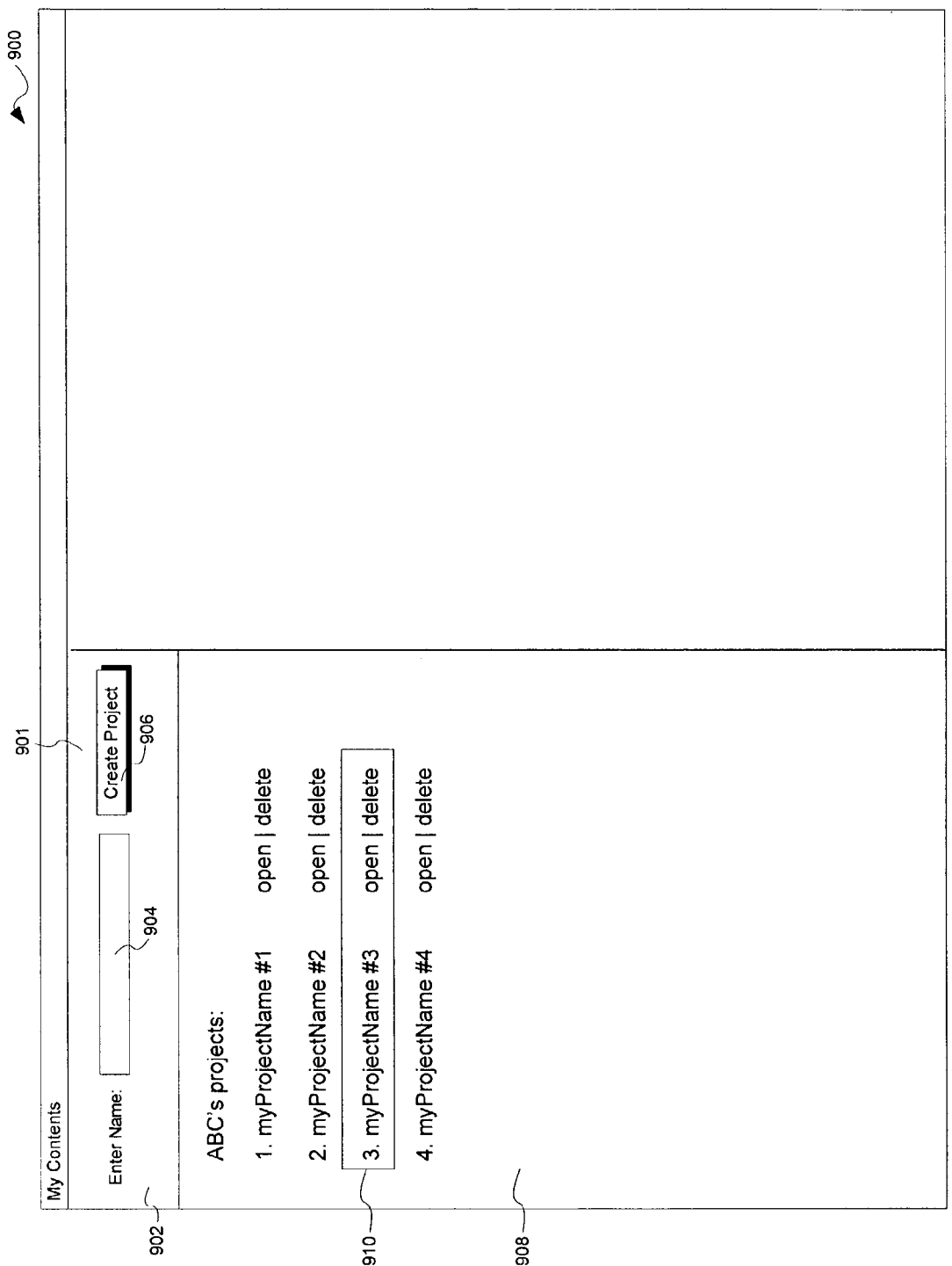
FIGS. 9A-B depict exemplary title creation displays according to an embodiment of the invention.

FIG. 9A depicts exemplary title creation screen display 900 according to an embodiment of the invention. The number of digital content file s that a title can contain is substantial. Furthermore, the addressing or referencing scheme used by the content element is flexible to support numerous simple and complex structures such as URL's, object identifiers, domain names, alternate pointers, complex multi-part point-ers, and even embedded content. With embedded content, the title actually contains the content and can optionally support a variety of encoding and encryption schemes.

The display is divided into two sections, a new project pane 902, and a project list pane 908. A project is a set of digital content files that share the same title object. If the user opens myprojectName#3, 910 for example, a project detail display 920 appears, as in FIG. 9B.

Figure 9B:
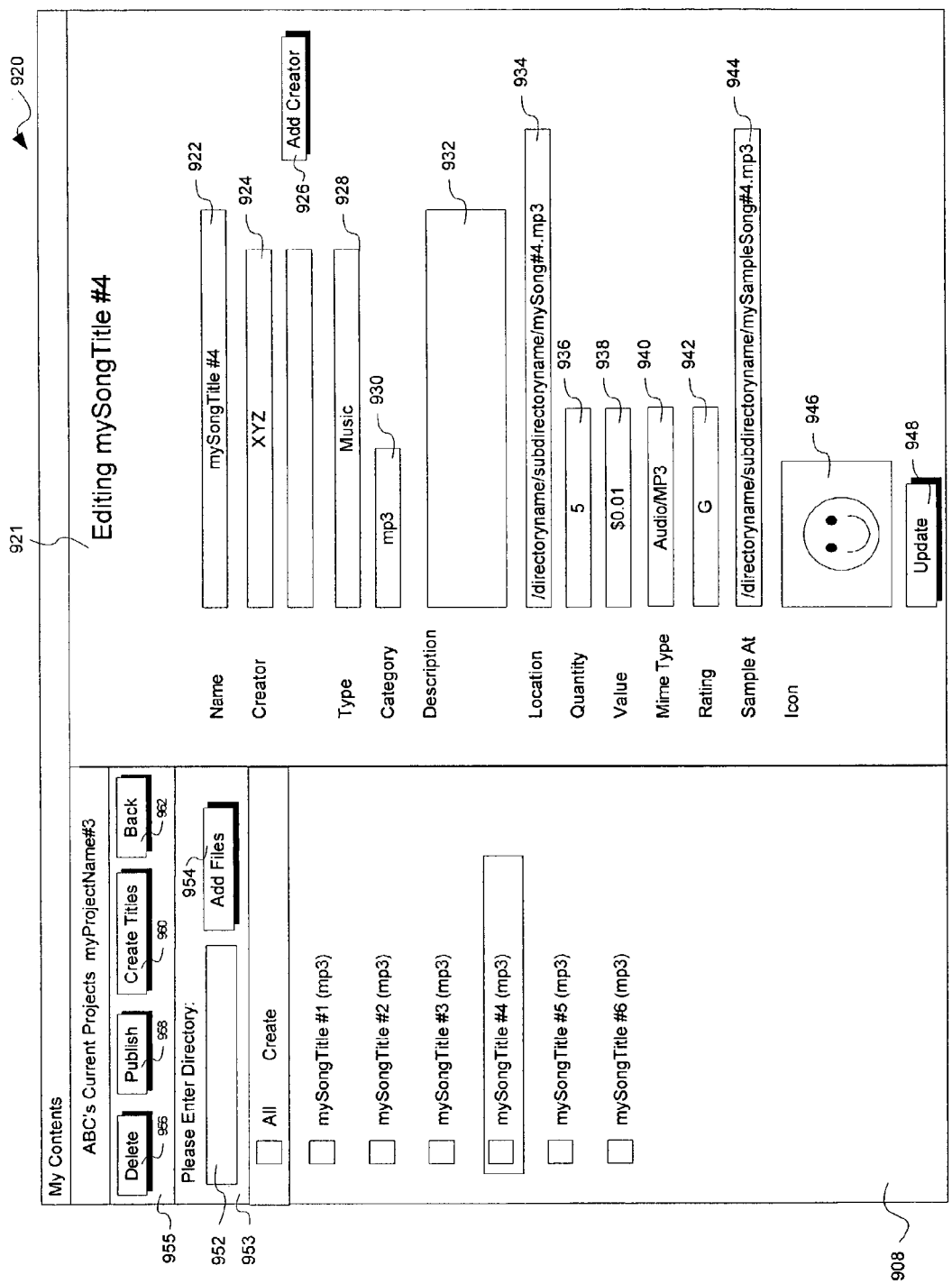

FIG. 9B depicts an exemplary project detail display 920 according to another embodiment of the invention. The display is divided into four sections. The first is an action pane 955 with a series of user selectable buttons: delete 956, publish 958, create titles 960, and Back 962. The second is an add file pane 953 with a user selectable button add files 954, and a field to enter the directory in which the files are stored 952. The third is a project list pane 908. And the fourth is a project detail pane 921.

Digital content file s can be quickly added to a project by entering the name of the directory in which they are located into user input field 952, and selecting the add files user selectable button 954. Furthermore, information contained in the title is shown and can be modified through fields the project detail pane 921 such as: name field 922, creator field 924, type field 928, category field 930, description field 932, location field 934, quantity field 936, value field 938, mime type field 940, rating field 942, sample at field 944, and icon field 946. When the users wish to save the information in the title, the user selectable button update 948 is selected.

Figure 10A:
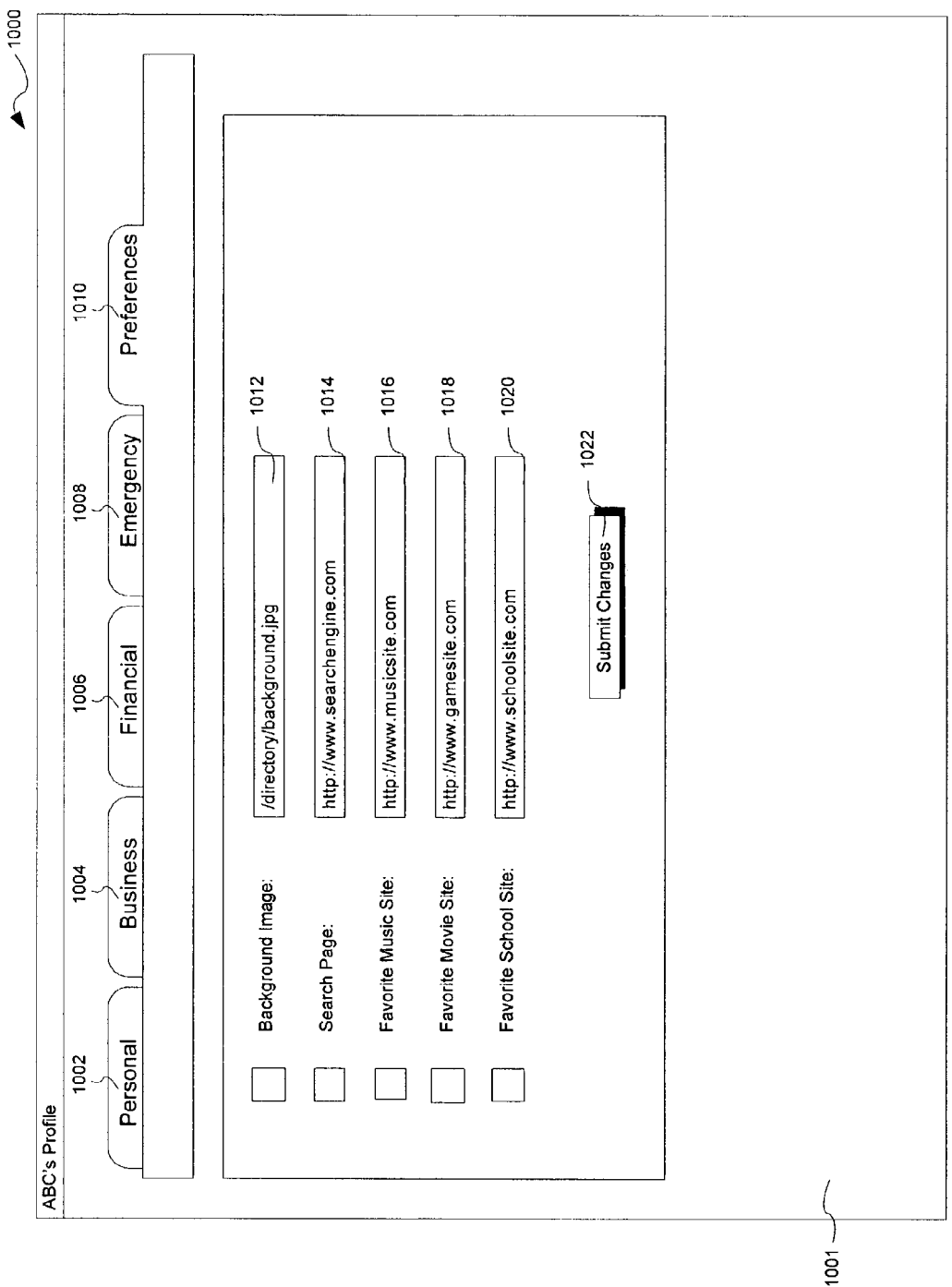

FIG. 10A depicts an exemplary administrative screen display 1000 according to another embodiment of the invention. This display is used to store administrative information about each user, preferences to customize the user interface, and custom rules that the user wants applied. The display is divided into 5 tabs: personal 1002, business 1004, financial 1006, emergency 1008, and preferences 1010. The preferences 1010 tab further contains the following fields: background image 1012, search page 1014, favorite music site 1016, favorite movie site 1018, and favorite school site 1020. When the users wish to save the information in the profile, the submit changes 1022 button is selected.

The business tab 1032, as shown FIG. 10B, contains the following fields: company came 1034, web site 1036, work phone # 1038, work email 1040, job title 1042, and work address 1044-1046. As in FIG. 10A, when the users wish to save the information in the profile, the submit changes 1022 button is selected.

Figure 11:
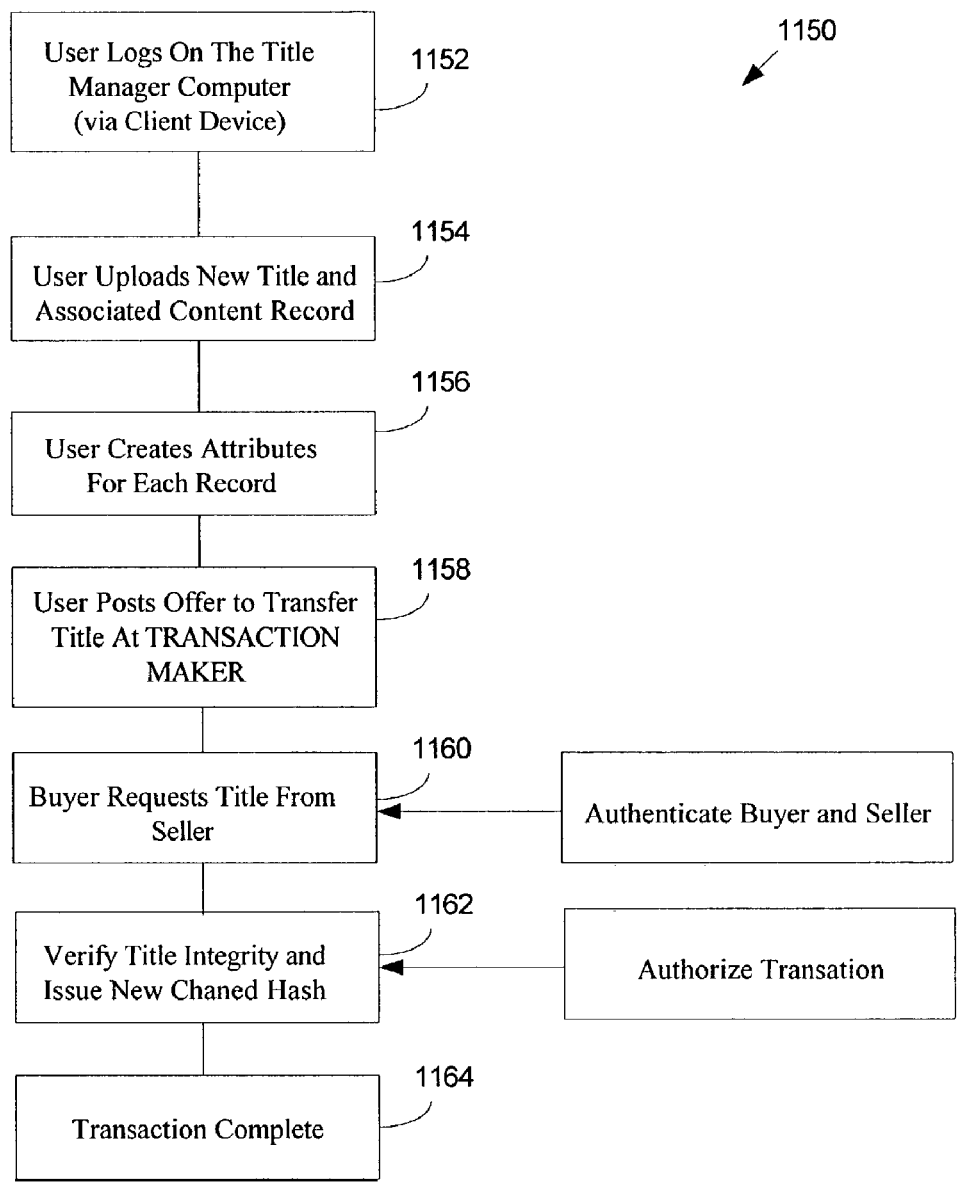
FIG. 11 is a flow chart showing steps for performing a title transfer according to an embodiment of the invention.

FIG. 11 is a flow chart showing steps for performing a title transfer according to an embodiment of the invention. Initially, the user logs on the title manager computer 1152 and uploads a new title and associated content record 1154. The user then creates attributes for each record 1156. The user then posts an offer to transfer the title on transaction maker 1158. A buyer who desires the digital content file requests the title from the seller 1160, whereby both the buyer and seller are authenticated. The title integrity is verified and a new chained hash is issued 1162, authorizing the transaction. When this is accomplished, the transaction is complete 1164.

C. METHODS OF FACILITATING MERCHANT TRANSACTIONS

Figure 12A:
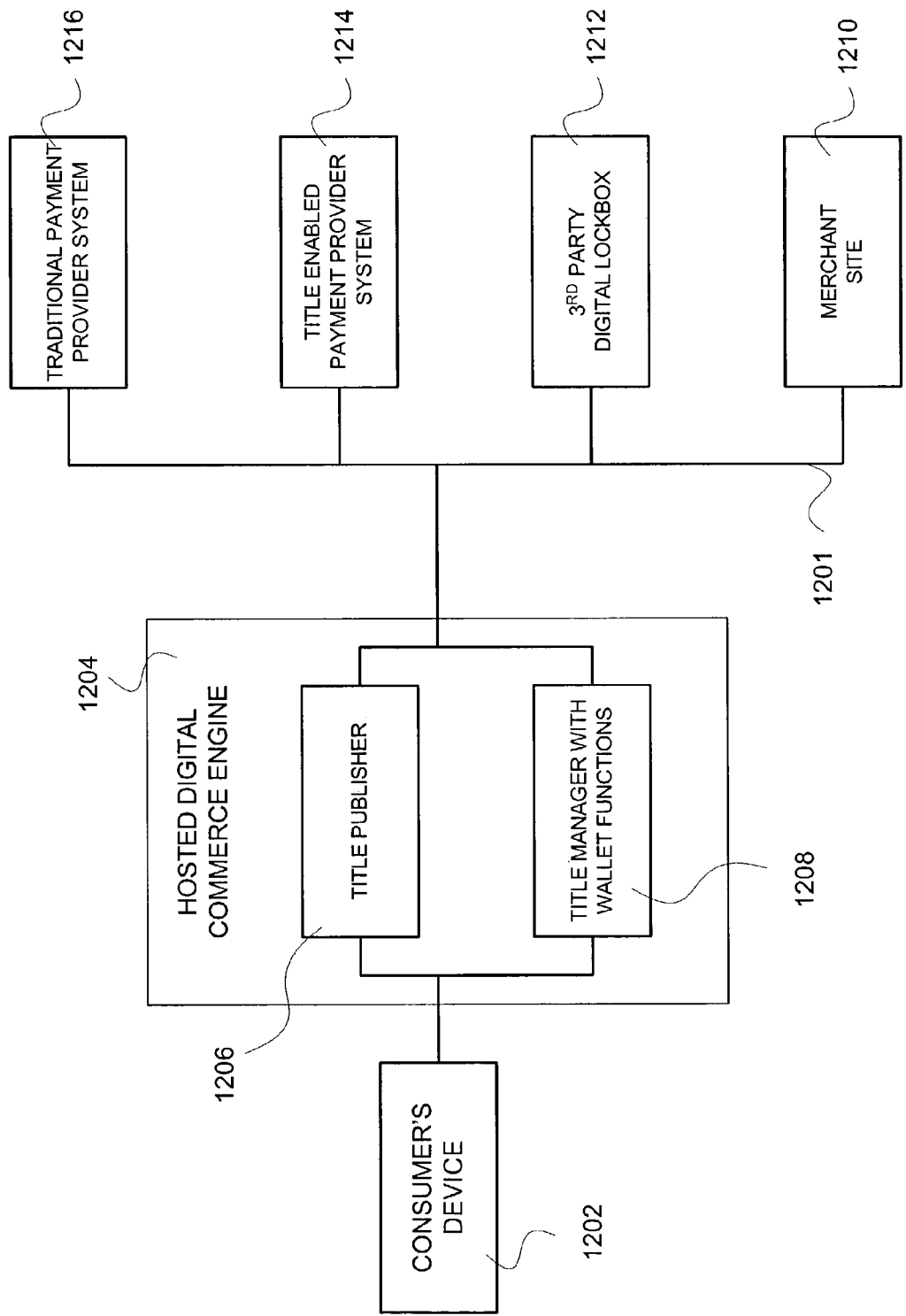
FIG. 12A depicts a title payment system according to an embodiment of the invention.

FIG. 12A depicts an exemplary diagram according to one embodiment of the invention, in which an online payment system is enabled through the exchange of titles. This embodiment addresses the importance of online payment systems for Internet merchants, since direct human interaction with customers is both costly and often inconvenient.

Current online payment systems commonly require bank cards, such as Visa or Master Card. In order to complete a purchase, customers must enter the bank card account information, along with personal contact information, into an online form at the merchant Internet site. Often, the information is stored by the merchant to simplify future customer purchases. For instance, instead of having to re-enter the information, the customer can just authenticate with a login and password, and complete the purchase.

Customer fears about data security and confidentiality, however, have inhibited ecommerce growth. And although security systems have greatly improved, criminal sophistication has also increased. Customers are not only inconvenienced with having to enter and re-enter account information at every merchants site, they are also concerned with propagation of their account information, protection of their privacy at each of the merchants site, and tracking of their habits and activities online.

Because of the distributed and anonymous nature of the Internet, online merchants are prone to both fraudulent bank card transactions and malicious hacking attacks. These same merchants, however, cannot remain in business if their attempts to increase security result in unintended customer frustration. Modern payment systems must both enhance the customer buying experience and be secure. A modern payment system must also support anonymous payment methods similar to the physical cash schemes that are currently in use throughout the world.

FIG. 12A is an exemplary diagram of a title payment system. The system in FIG. 12A comprises a consumer's device 1202 connected to an online, hosted digital commerce engine (DCE) 1204. The DCE is a hosted service that operates a title publisher 1206 and a title manager 1208. The DCE is typically hosted by a network provider such as an internet service provider, application service provider, and/or mobile operator. The title manager 1208 provides wallet functionality in order to handle the various payment processes and payment titles. The system in FIG. 12A also comprises a merchant site 1210, third party digital lockbox 1212, title enabled payment provider 1214, and a traditional payment provider 1216. In this example, all communications occur over a TCP/IP network 1201 but can be implemented using any number of protocols and communication implementations.

Consumer's device 1202 presents the user interface of the online title manager and wallet through which titles and digital content file s are managed, transacted, and delivered. The device can be almost any type of computing device that can communicate with the DCE, including desktop computers, laptops, PDA's, and mobile phones. The title manager 1208 located in the DCE provides title management services to the consumer such as adding, viewing, and trading titles. Additionally, the title manager 1208 provides wallet functionality for viewing accounts, currencies, and receipts as well as handling payment processing on behalf of the consumer. Optionally, the functionality offered by both the consumer's device and the DCE can be packaged in a number of ways including a completely integrated application to be run on a consumer's device such as a desktop computer.

Figure 12B:
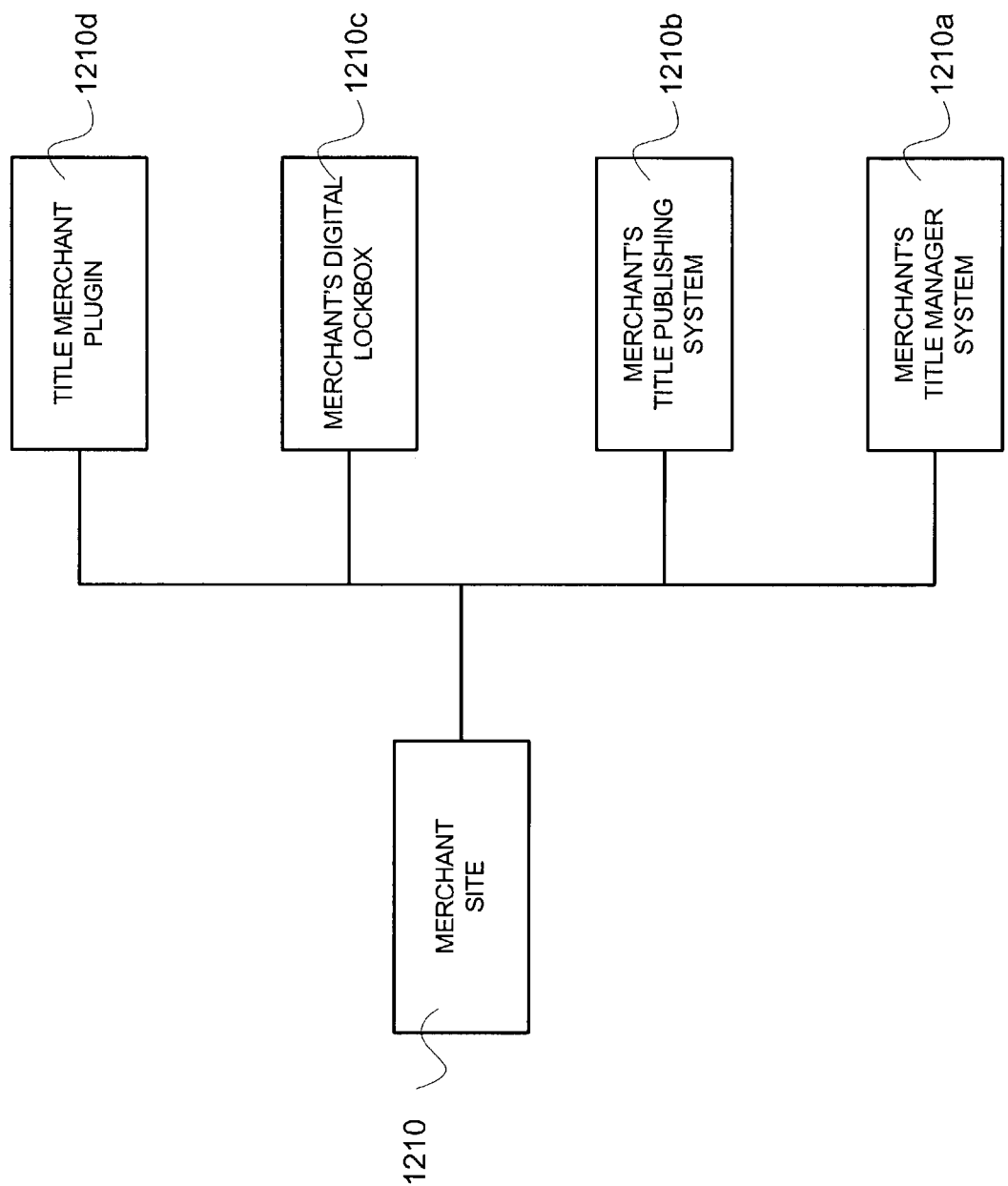
FIG. 12B depicts a title payment system with a digital lockbox according to an embodiment of the invention.

The merchant site 1210 is an online merchant system that provides both web-based and e-commerce functionality such as catalog, product information, product configurators, shopping pages, shopping cart, and payment services. While only one merchant site is shown in the diagram, the invention can support any number of merchant sites. The merchant site 1210 is further comprised of title-enabled components as shown in FIG. 12B. As shown in FIG. 12B, the merchant site can include a title manager 1210a, title publisher 1210b, digital lockbox 1210c, and title merchant plugin 1210d. All components are optionally operated by the merchant but are generally available to merchants that are title enabled. The title manager 1210a provides the merchant with management functions for titles that they own or potentially for customers. The title publisher 1210b allows the merchant to publish titles such as the titles that may be given to customers that reference customer's rights to digital content file s. The digital lockbox 1210c is an example where the merchant hosts the lockbox for trading purposes instead of a third party service. The title merchant plugin 1210d provides payment support services for the merchant including communication with digital lockboxes, title verification, and an interface with payment providers. While only one component of each type is shown, the invention can support any number of components to be hosted by the merchant.

The third party digital lockbox 1212 in FIG. 12A is an application that provides a temporary and secure safe harbor for all transaction titles until title rights are established. While only one digital lockbox is shown, the invention can support any number of digital lockboxes. It is generally hosted somewhere in the network by the merchant, or a trusted third party escrow service. For instance, a title may be released to the consumer from lockbox 1212 once the purchase is completed. As shown in FIG. 12B the merchant site can also host a digital lockbox 1210c to provide a mechanism for supporting the payment process, that is supporting exchange transactions, in lieu of a third party service.

Figure 12C:
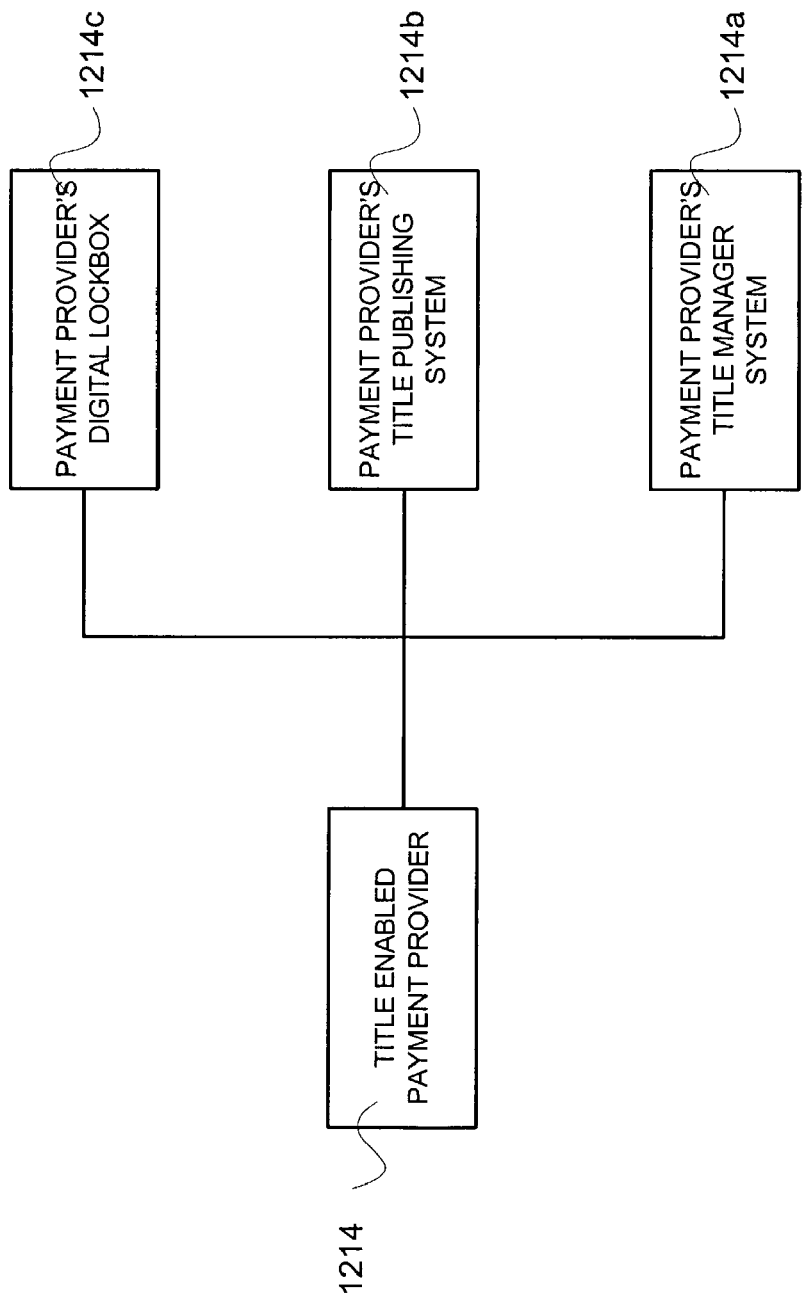
FIG. 12C depicts a title payment system with a digital lockbox, a title manager, and a title publisher according to an embodiment of the invention.

The title enabled payment provider 1214 is an online payment provider service that is title enabled, in that they can support title based transactions. While only one title enabled payment provider is shown, the invention can support any number of title enabled payment providers. In addition to supporting titles, a title enabled payment provider 1214 would provide services typical of a payment provider such as payment processing, gateways to payment networks, and merchant accounts. As shown in FIG. 12C a title enabled payment provider 1214 can operate title-enabled components such as title manager 1214a, title publisher 1214b and digital lockbox 1214c. These components would provide the same services to the payment provider as similar components provided to the merchant site 1210.

Each of the system elements shown in FIG. 12A, FIG. 12B, and FIG. 12C are coupled to the other using a network protocol 1201, such as TCP/IP over the Internet. Furthermore, consumers can access online title manager 1210a functions directly within merchant sites 1210 if they are permitted. For instance, payment options shown at the merchant site reflect those available in the online title manager 1208, but other options can be added.

As previously described, a title is an object that may have a number of elements and attributes including embedded digital content, ownership attributes, and copy permissions. In this example, a consumer wishes to buy a product or service from a merchant using a title transaction. A purchasing transaction generally comprises two or more separate titles: a product title or titles being offered by the merchant; and a payment slip title or payment titles being offered by the consumer. The product title or titles give the title owner specific rights to the product, for instance, the ability to play a song. The payment slip title is a financial instrument that authorizes a payment provider to pay the merchant for any product titles purchased. Once the transaction is complete, the consumer would be in possession of the product title or titles and the merchant would be in possession of the payment slip title or payment titles.

For instance, a customer would use a web browser on customer's device 1202 to access a merchant site 1210 through online title manager 1204. When the merchant site determines that the transaction is title-enabled, it presents the product title choices and displays the consumer's title payment options. Once items are selected for purchase, the merchant site places the product titles in a digital lockbox 1212, generates a pre-filled sales order title comprising transaction details including a transaction number, product title information, purchase detail, and information on the digital lockbox 1212. The sales order title functions as an electronic invoice or promise of payment for the merchant 1210.

The sales order is transmitted back to title manager 1204 and stored for the consumer to view, select payment type, and approve using the consumer device 1202. Once approved by the consumer, the title publisher 1206 may generate a payment slip title using the sales order title as a guide. The payment slip title is transmitted to the digital lockbox 1212 and the merchant 1210 is notified. The merchant 1210 verifies the payment slip title in the digital lockbox 1212 and completes the transaction by releasing the product titles to the customer. A receipt title can also be generated and included in the transaction if requested or required. The merchant 1212 then captures payment from the customer by forwarding the completed payment slip title to the title payment provider 1214 for payment. Alternatively, the merchant 1210 can use a standard collection process such as that used for credit card processing, and deal directly with a traditional payment provider 1216.

Figure 13A:
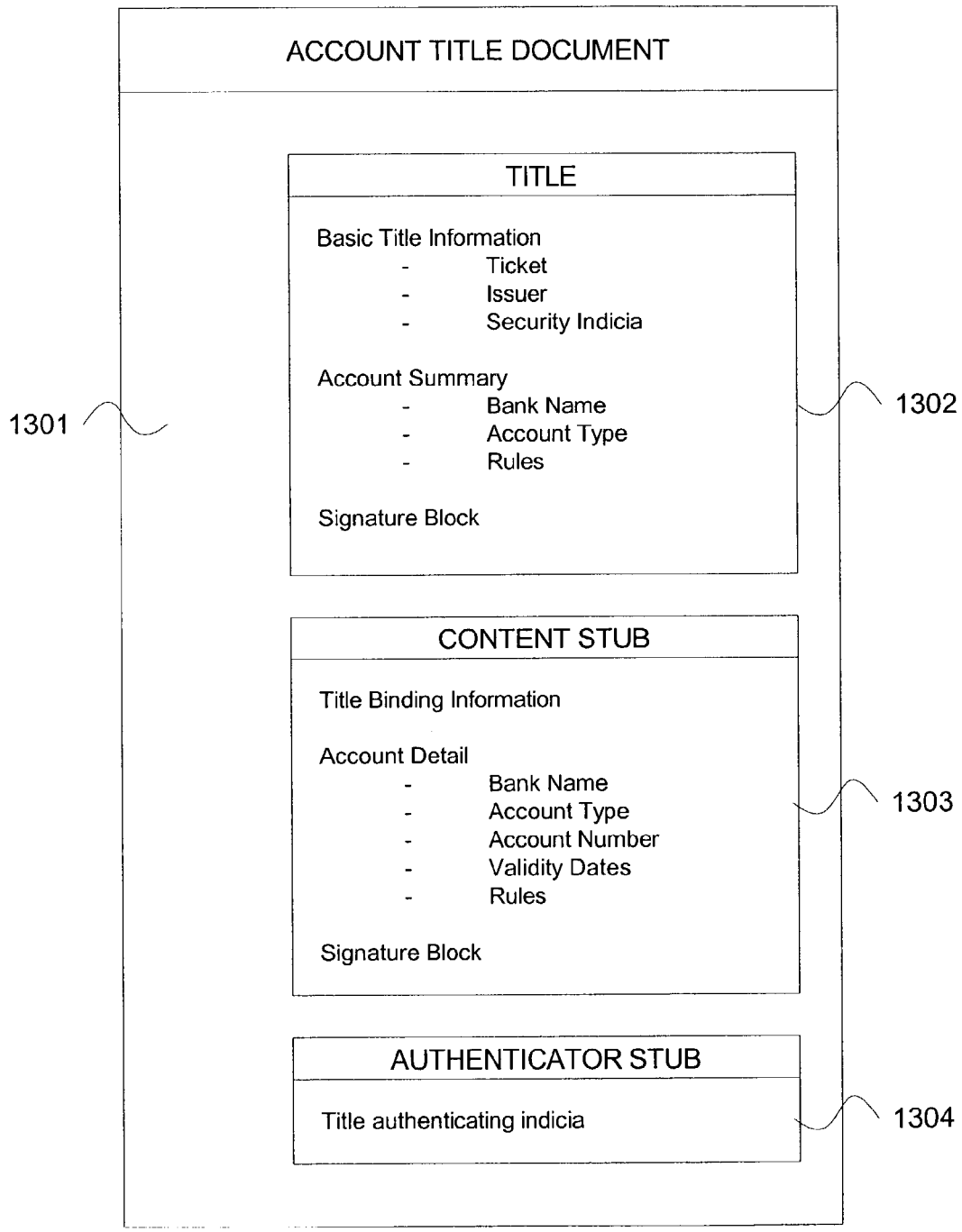
Figure 13B:
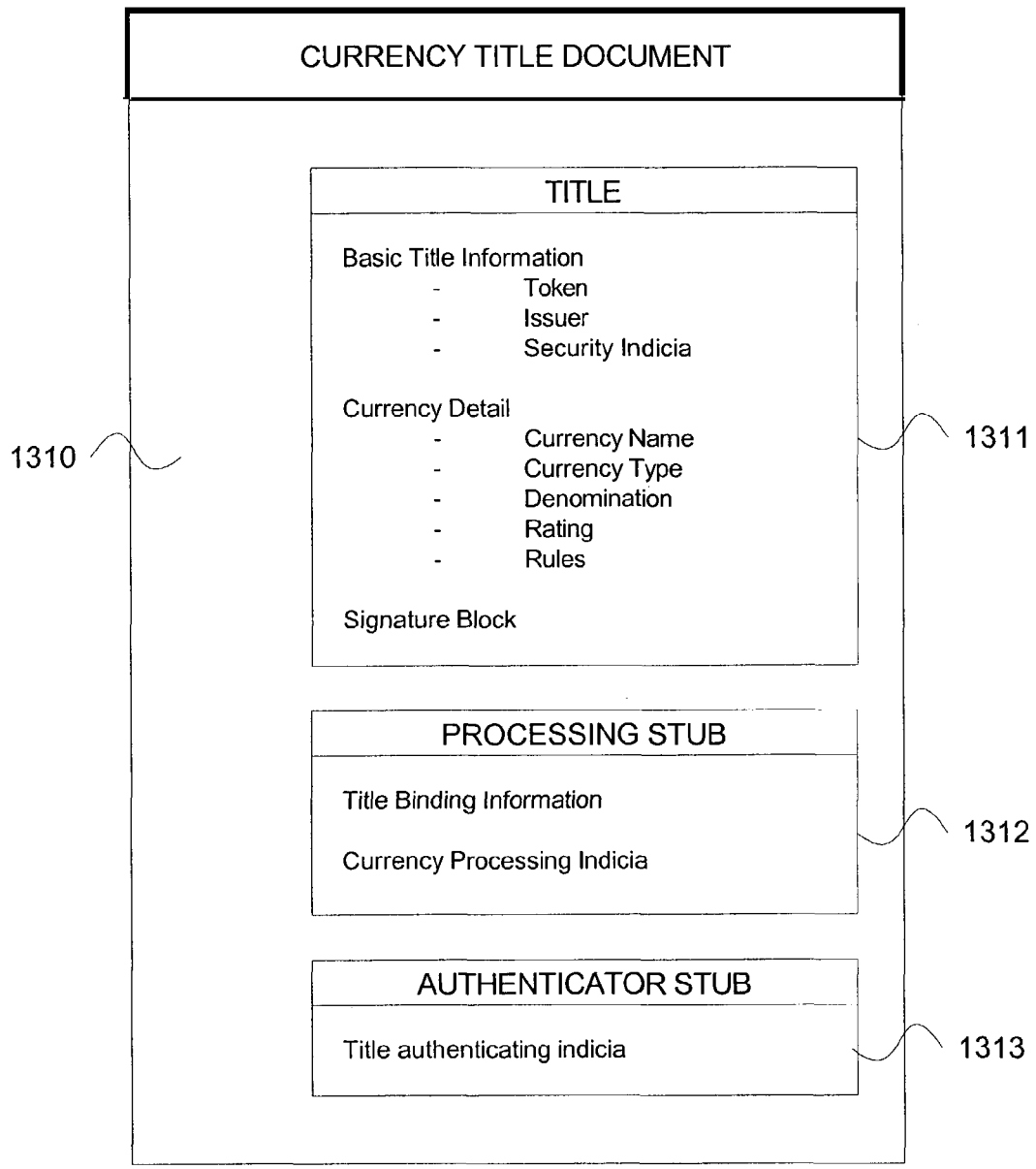
Figure 13C:
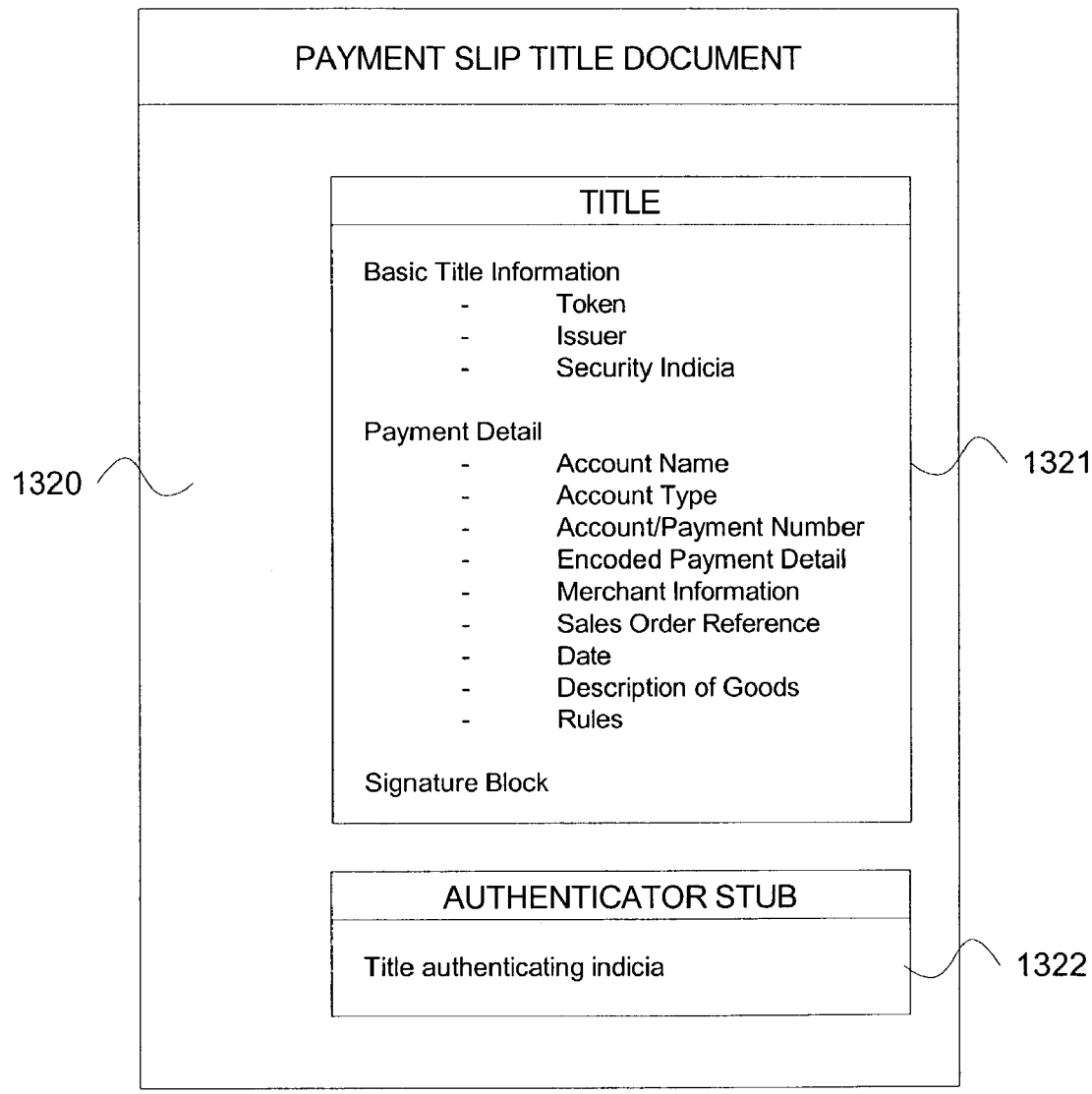

FIGS. 13A, 13B, and 13C depict exemplary payment transaction data structures according to an embodiment of the invention. Each data structure is maintained within the online title manager 1204, 1210a, and 1214a, previously displayed in FIGS. 12A, 12B, and 12C.

FIG. 13A displays an account title 1301. In this example, an account title represents a bank card or a debit card. Each account title 1301 can further contain sub-elements such as access information and other account details. The structure of an account title 1301 is that basic account information is contained in a standard title block 1302 and detailed account information is contained in a content stub 1303. Containing the detail in a content stub 1303 provides additional control and flexibility of what information is displayed, transmitted, and shared through a transaction. An account title is generally a ticket since it is issued to a particular person and cannot be traded. This is indicated in 1302 and as is standard with tickets an authenticator stub 1304 is included.

FIG. 13B displays a currency title 1310. Unlike a bank card, a currency functions as a pre-paid card or traveler's check that can be redeemed at the issuing title currency merchant. Currency is purchased in the issued denominations of that legal tender. For instance, in the case of U.S. Dollars, the denominations would be $0.01, $0.05, $0.25, $1.00, etc. Each currency title 1310 represents a specific currency and a specific denomination such as $1.00 US. The currency title 1310 contains additional information regarding the currency such as issuer, type, and rules associated with the currency this is indicated in 1311. Unlike account titles, currency titles are generally tokens since ownership is dependent on possession and currency can be traded or transferred. As with all tokens an authenticator stub 1313 is included. In another example of a currency title 1310, the denomination may only be valid at time of issuance, and the title can be divisible, that is the currency title can be used for transactions requiring smaller denominations such as micro transactions. In this case, the currency title can contain a processing stub 1312 to hold processing indicia used during micro transactions.

FIG. 13C depicts an exemplary payment slip title according to an embodiment of the invention. A payment slip title 1320 is shown and is formatted similar to previous titles. The difference with a payment slip title is the content that it refers to and contains. The payment slip title 1320 has a payment detail section 1321 that contains specific information relating to the payment type used by the consumer. As previously described, the payment slip title is generated by the title publisher 1206 as shown in FIG. 12A, using the sales order title as a guide. The payment detail 1321 section of the title is actual title content and contains specific information relating to payment for the product. The information contained in payment detail 1321 may vary depending on the payment mechanism selected by the consumer such as account, blinded account, secure account, etc. Generally, the information may contain payment detail (such as amount), account name, type number, as well a basic order information including transaction number, merchant, date, description of product and any rules associated with payment. Some or all of this information maybe encoded such that only a title enabled payment provider 1214 or traditional payment provider 1216 can decode.

Figure 13D:
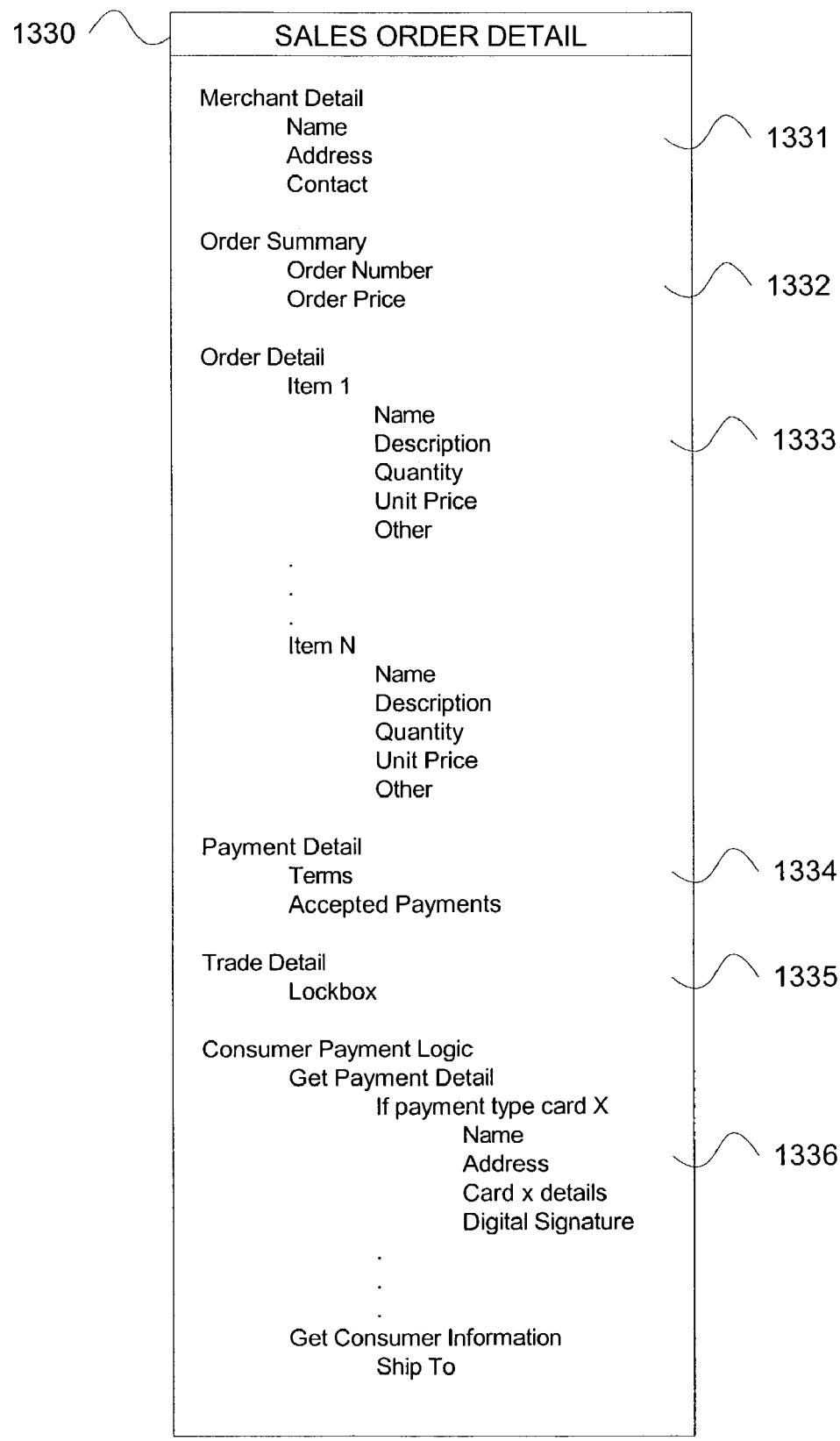

As described previously, a sales order title is created by the title publisher 1210b operated by the merchant site 1210 as shown in FIG. 12B. The sales order title is used as an invoice and sent to the consumer's title manager 1208 shown in FIG. 12A. The consumer's title publisher 1206 may create a payment slip title 1320 using sales order title as a guide. The sales order title is similar to previous titles but may instead contain sales order information within the content element. FIG. 13D depicts an exemplary sales order detail 1330 section that would be included within a title similar to the currency detail 1311 being included in 1310 and payment detail 1321 being included in 1320. The sales order detail 1330 contains merchant detail 1331, order summary information 1332, order detail 1333, payment detail 1334, trade detail 1335, and consumer payment logic 1336. Order summary 1332 provides summary information on the order including order number, total price, and taxes. Order detail 1333 provides line item detail for each product offered for sale, including unit and extended pricing. Payment detail 1334 provides detail definitions for the terms and conditions as well as the accepted payment types such as Visa, Mastercard, bank card, and cash. Trade detail 1335 provides information regarding the trade (product titles for payment titles) such as the location of the digital lockbox 1212. Consumer payment logic 1336 defines logic statements that can control how a payment slip is generated. These are basically instructions to the title publisher 1206 for handling specific payment mechanisms.

FIG. 13E depicts an exemplary title data table according to an embodiment of the invention. The title data table 1340 may be used by a title manager 1208, 1210a, 1214a to store all titles used in payment transactions. As shown in FIG. 13E, the table can contain any number of titles including currency titles 1342, account titles 1344, sales order titles 1346, and payment slip titles 1348.

Figure 14:
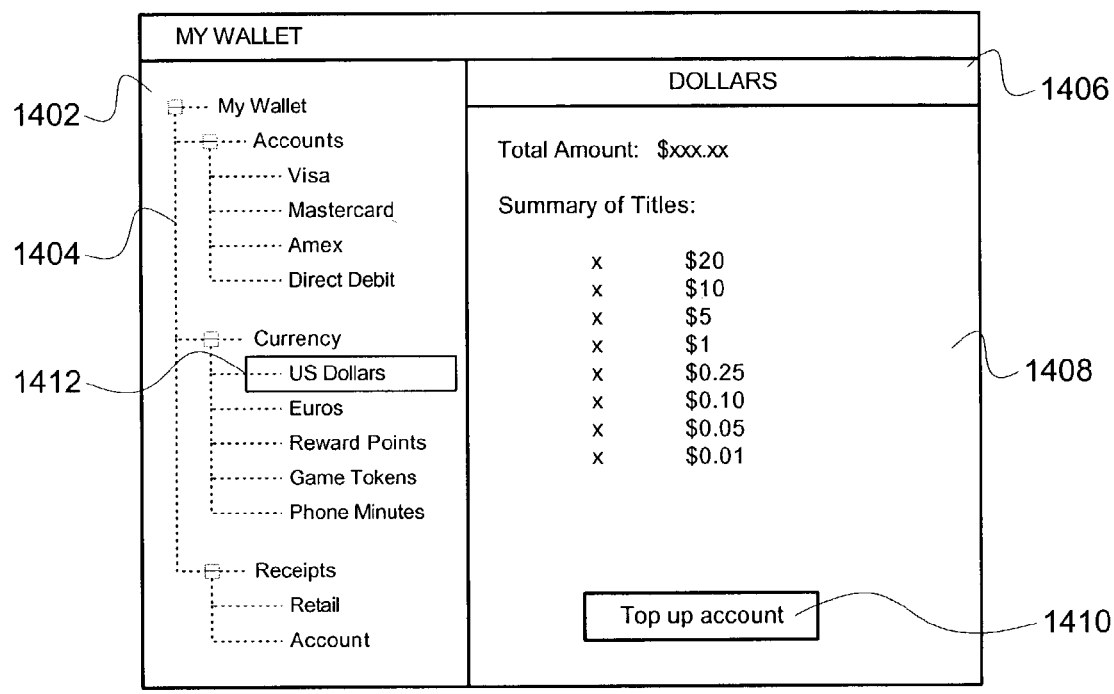
FIGS. 14-15 depict exemplary title management displays according to an embodiment of the invention; and, FIGS. 16-22B are flow charts showing steps for performing merchant transactions according to an embodiment of the invention.

FIG. 14 depicts an exemplary online title manager that is displayed in a browser on consumer's device 1202, as described in FIG. 12. The display is divided into two sections, a title folder pane 1402 and a title content pane 1406. The tile folder pane 1402 further organizes the titles into folders based on type 1404, although only my wallet titles are displayed. Examples include accounts, currency, and receipts. The accounts folder contains titles of bank cards, debit cards, and direct debit transactions. The currency folder contains titles of pre-paid currencies, as well as other pre-paid accounts that can be used for payment, such as gaming tokens and cell phone minutes. The receipts folder contains receipts for the customer's purchases, organized by type, such as retail and account.

The title content pane 1406 presents summarized information 1408 for account, currency, or receipt titles. Title content pane 1406 also allows the consumer to modify authorized entries within the titles. For example, the user has selected the dollars currency title 1412. This displays a summary of the currency amounts contained with the title, as well as allows the user to top up the account 1410 with additional currency.

Figure 15:
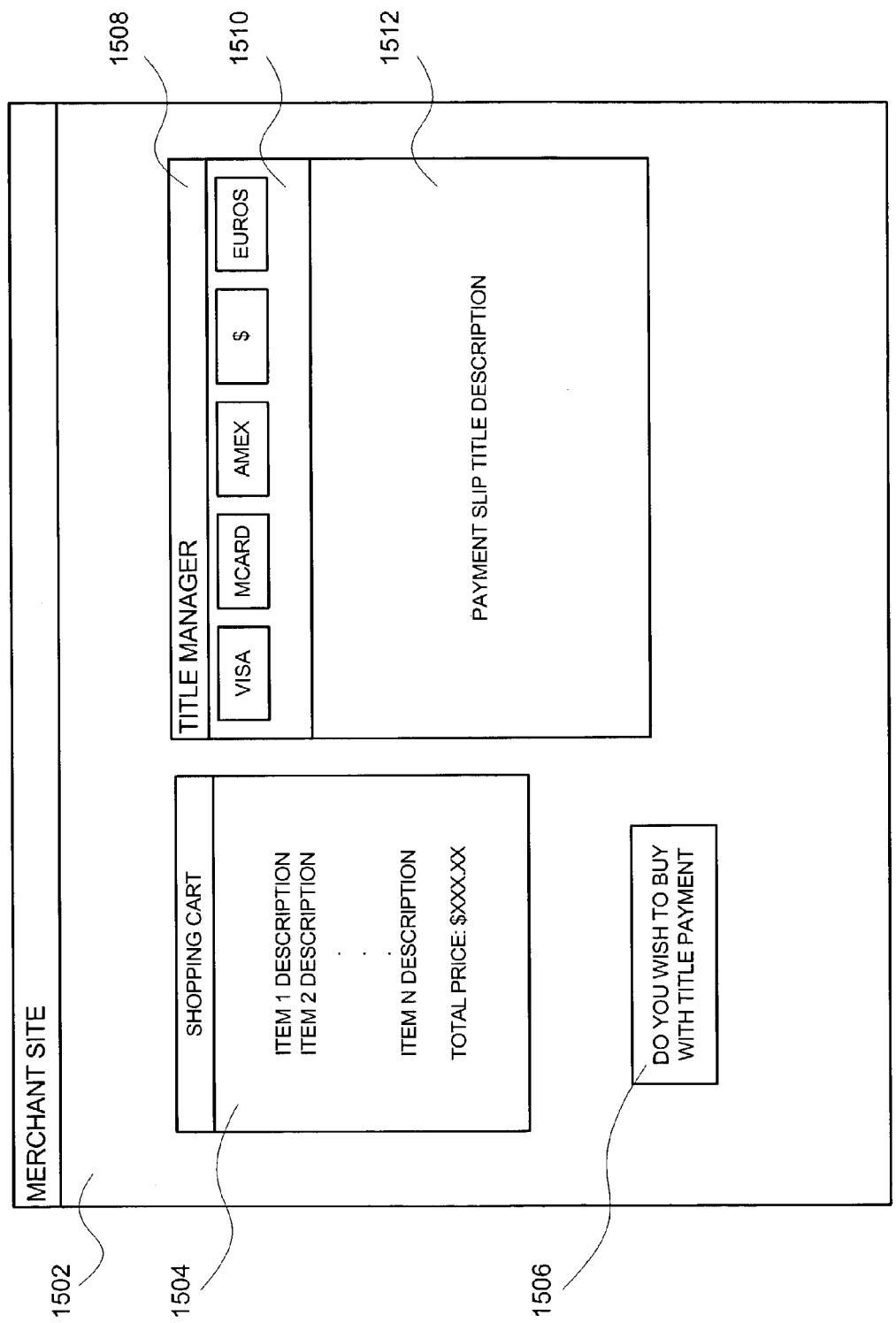

FIG. 15 depicts an exemplary merchant site 1502 that would be displayed in a browser on the consumer's device 1202, as described in FIG. 12. In addition to common merchant site elements, such as the shopping cart item description 1504, the consumer's title manager 1508 is displayed in a sub-window within or on top of the browser like a wallet application. In the title manager 1508, the device presents the consumer with available payment structures 1510, as well as a payment slip description 1512 when it is received from the merchant site 1210. Using the title manager window (i.e. the wallet application), the consumer can select a payment structure and make payment for the products presented in 1512.

Figure 16:
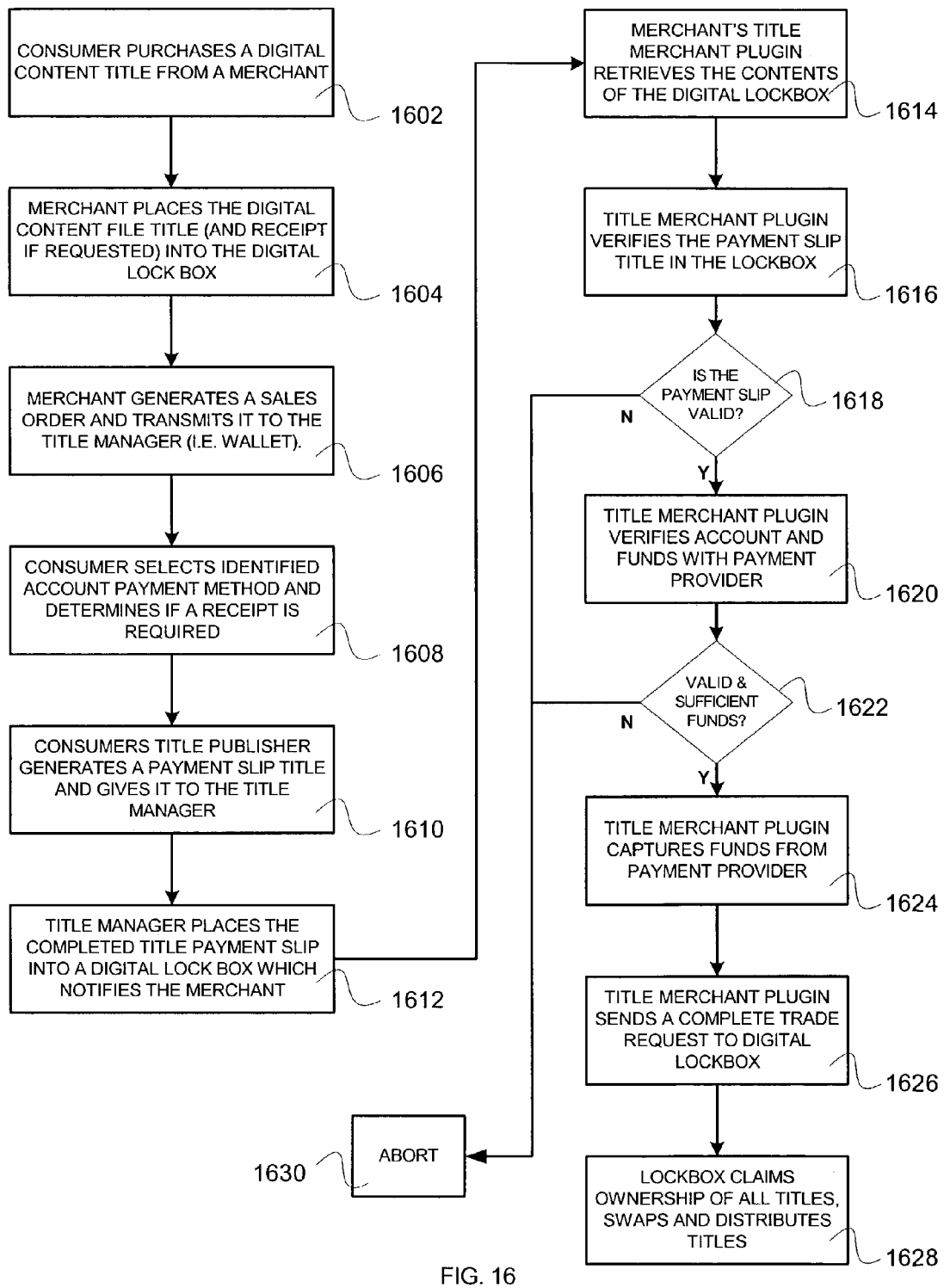

FIG. 16 is an exemplary flow chart describing the steps in which the consumer chooses an identified account payment structure for the payment slip title. In this example, an identified (or named) account could be a Visa credit card account where the owner of the account is named on the card as well as the card number. This differs from a blinded account where the owner and account information is not divulged. This example is intended to show a typical credit card transaction where the title transaction system is setup to handle traditional payment mechanisms using current, traditional payment provider networks and technologies. In step 1602, the consumer purchases a digital content file title from a merchant, such as MerchantStore.com. In step 1604, the merchant places the titles expressing rights to the digital content file s and if requested a digital receipt into the digital lockbox 1212. In step 1606 the merchant generates a sales order title and transmits it to the consumer's title manager 1208. In step 1608, the consumer then selects the desired form of payment and if a receipt is required from the merchant. In this example, the consumer would select a Visa credit card account. In step 1610, the consumer's title publisher 1206 creates a payment slip title and in step 1612 the title manager 1208 places it into the digital lockbox 1212 which then notifies the merchant. In step 1614, the merchant's title merchant plugin 1210*d* retrieves the contents of the lockbox. In step 1616, the title merchant plugin 1210*d* verifies the payment slip title and if valid (step 1618) may verify the identified account and funds in step 1620. If the account is valid and sufficient funds are available (step 1622), the title merchant plugin may capture funds from the payment provider 1216 (step 1624). In step 1626 the title merchant plugin sends a complete trade request to the digital lockbox. In step 1628 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 17:
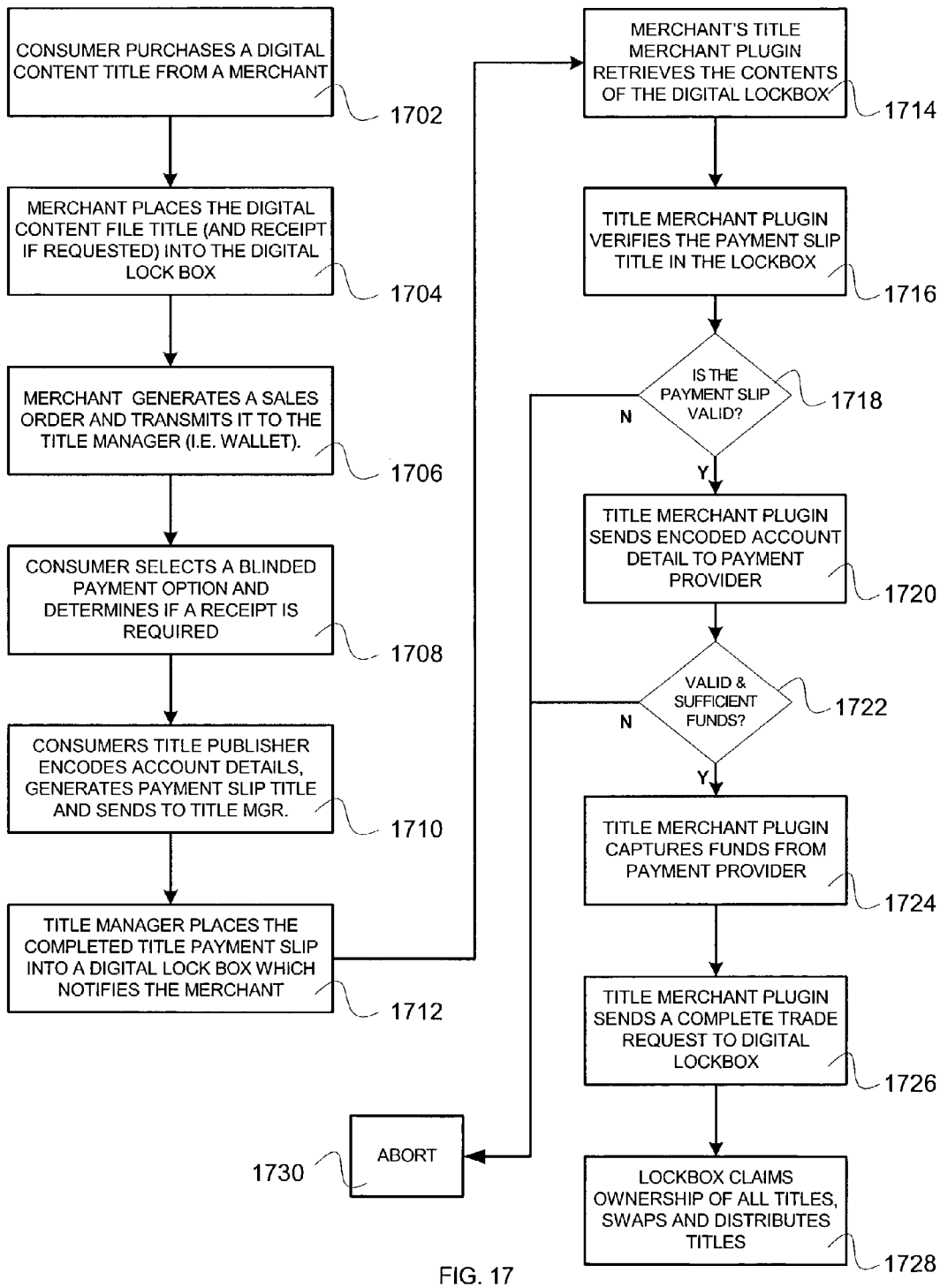

FIG. 17 is an exemplary flow chart describing the steps in which the consumer chooses a blinded payment structure for the payment slip title. In this example, a blinded account is used as the payment mechanism in order to protect the account holders name and the account number. The actual account in this case can be a credit card, bank card or other account or even some other payment mechanism. In step 1702, the consumer purchases a digital content file title from a merchant, such as MerchantStore.com. In step 1704, the merchant places the titles expressing rights to the digital content file s and if requested a digital receipt into the digital lockbox 1212. In step 1706 the merchant generates a sales order title and transmits it to the consumer's title manager 1208. In step 1708, the consumer then selects the desired form of payment and if a receipt is required from the merchant. In this example, the consumer would select a blinded Visa credit card account. In step 1710, the consumer's title publisher 1206 creates a payment slip title using encoded account information (rather than clear text account information) and in step 1712 the title manager 1208 places it into the digital lockbox 1212 which then notifies the merchant. In step 1714, the merchant's title merchant plugin 1210*d* retrieves the contents of the lockbox. In step 1716, the title merchant plugin 1210*d* verifies the payment slip title and if valid (step 1718) sends the encoded account information to a payment provider for approval in step 1720. If the account is valid and sufficient funds are available (step 1722), the title merchant plugin may capture funds from the payment provider 1216 (step 1724). In step 1726 the title merchant plugin sends a complete trade request to the digital lockbox. In step 1728 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 18:
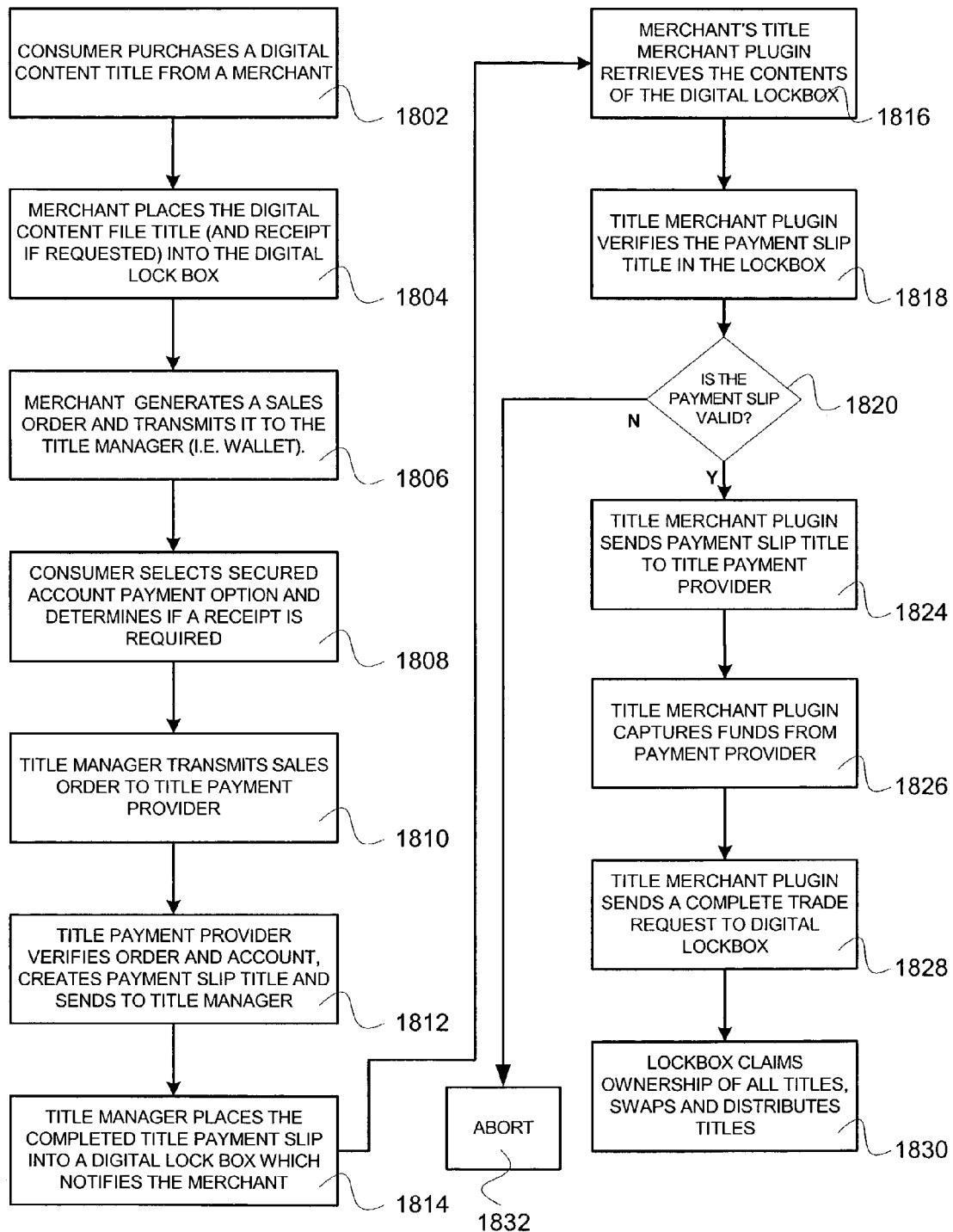

FIG. 18 is an exemplary flow chart describing the steps in which the consumer chooses a secured account payment structure for the payment slip title. In this example, a secure account is used as the payment mechanism in order to protect the account holders name and the account number. The actual account in this case can be a credit card, bank card or other account or even some other payment mechanism. In this example, a secured account differs from a blinded account in that the secure code used for approving the release of funds is obtained by the consumer rather than the merchant. This example is intended to show the flexibility of the title transaction system in supporting a variety of transaction processes. In step 1802, the consumer purchases a digital content file title from a merchant, such as MerchantStore.com. In step 1804, the merchant places the titles expressing rights to the digital content file s and if requested a digital receipt into the digital lockbox 1212. In step 1806 the merchant generates a sales order title and transmits it to the consumer's title manager 1208. In step 1808, the consumer then selects the desired form of payment and if a receipt is required from the merchant. In this example, the consumer would select a secured account payment option. In step 1810 the consumer's title manager 1208 transmits the sales order to the title payment provider 1214. In step 1812 the title payment provider 1214 verifies the order and account, and if the account is valid and sufficient funds are available, creates a payment slip title and transmits it back to the consumer's title manager 1208. In this example, the title enabled payment provider's title publisher 1214*b* creates the payment slip. Also in this example, the title enabled payment provider creates an approval code that the merchant can verify. In step 1814, the consumer's title manager 1208 places it into the digital lockbox 1212 which then notifies the merchant. In step 1816, the merchant's title merchant plugin 1210*d* retrieves the contents of the lockbox. In step 1818, the title merchant plugin 1210*d* verifies the payment slip title and if valid (step 1820) sends the payment slip title to the title enabled payment provider 1214. In step 1826 the title merchant plugin may capture funds from the title enabled payment provider 1214. In step 1828 the title merchant plugin sends a complete trade request to the digital lockbox. In step 1830 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 19:
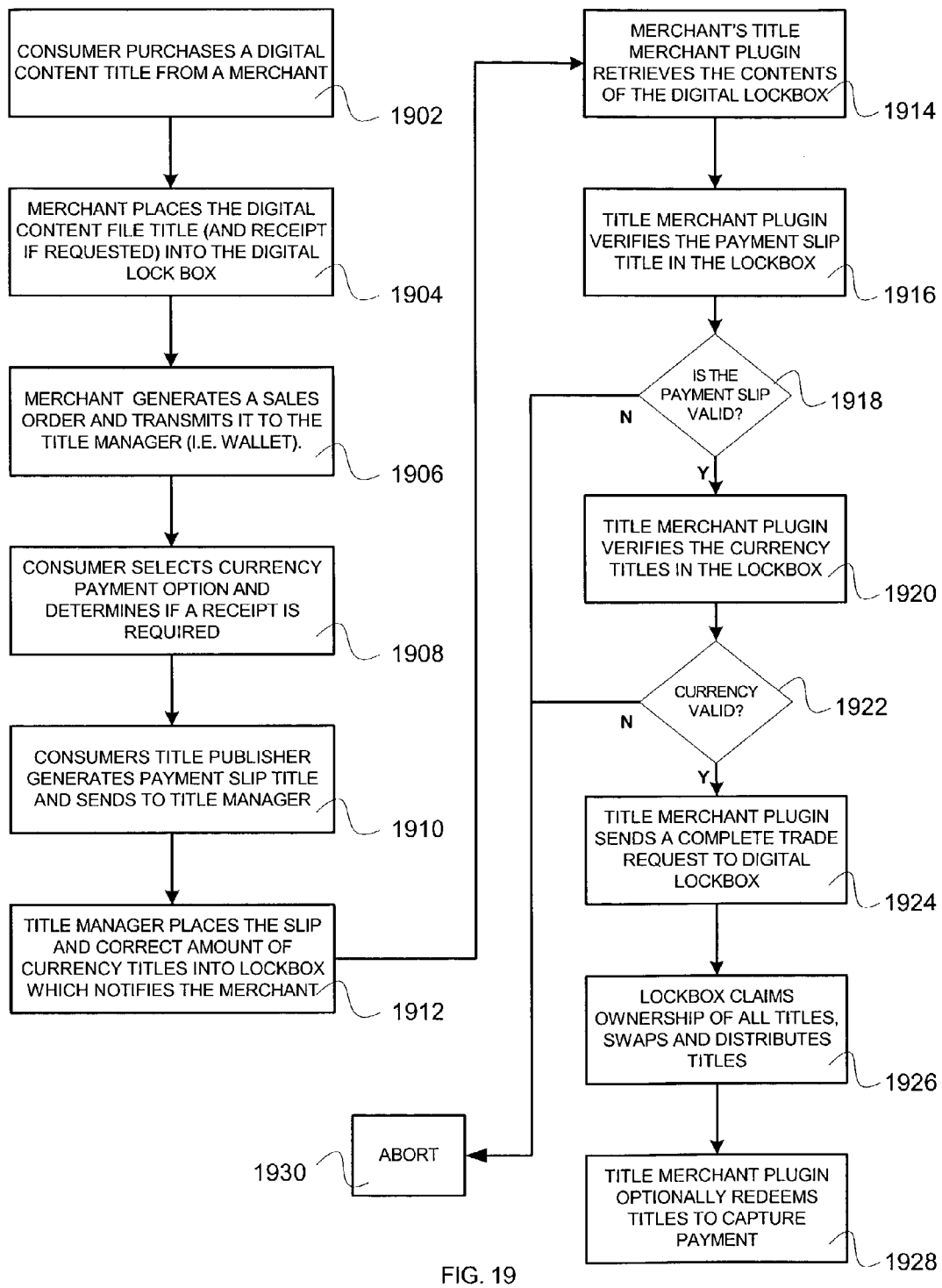

FIG. 19 is an exemplary flow chart describing the steps in which the consumer chooses a currency payment structure for the payment slip title. In this example, currency titles (such as US dollars) are used as the payment mechanism. This is similar to a physical cash transaction. The currency can be any type of currency supported by the merchant and/or their payment provider. For example, the merchant could support Euros or even reward points as valid currency. In step 1902, the consumer purchases a digital content file title from a merchant, such as MerchantStore.com. In step 1904, the merchant places the titles expressing rights to the digital content file s and if requested a digital receipt into the digital lockbox 1212. In step 1906 the merchant generates a sales order title and transmits it to the consumer's title manager 1208. In step 1908, the consumer then selects the desired form of payment and if a receipt is required from the merchant. In this example, the consumer would select U.S. dollars currency. In step 1910, the consumer's title publisher 1206 creates a payment slip title referring to the US dollar currency and in step 1912 the title manager 1208 places the payment slip title and the correct amount of currency titles into the digital lockbox 1212 which then notifies the merchant. In this example, the payment slip title is provided but maybe optional in currency title transactions since the currency titles are valid themselves and do not refer to a user held account. Additionally, the title manager 1208 can process the currency titles to ensure that the exact amount of currency titles is placed in the digital lockbox 1212. This processing depends on the currency type being support, for instance the title manager may need to divide the currency or go through a process where in the title manager exchanges the currency in the wallet for change. In step 1914, the merchant's title merchant plugin 1210*d* retrieves the contents of the lockbox. In step 1916, the title merchant plugin 1210*d* verifies the payment slip title and if valid (step 1918) verifies the currency titles in step 1920. If the currency titles are valid (step 1922) the title merchant plugin sends a complete trade request to the digital lockbox in step 1924. In step 1926 the digital lockbox completes the trade by claiming ownership over the titles in the lockbox, swapping the titles, and distributing them to the appropriate party. In this example, the consumer may receive the digital content file titles, and the merchant may receive the payment slip title and the currency titles. The merchant can optionally redeem the currency titles to capture payment in their account as indicated in step 1928.

Figure 20:
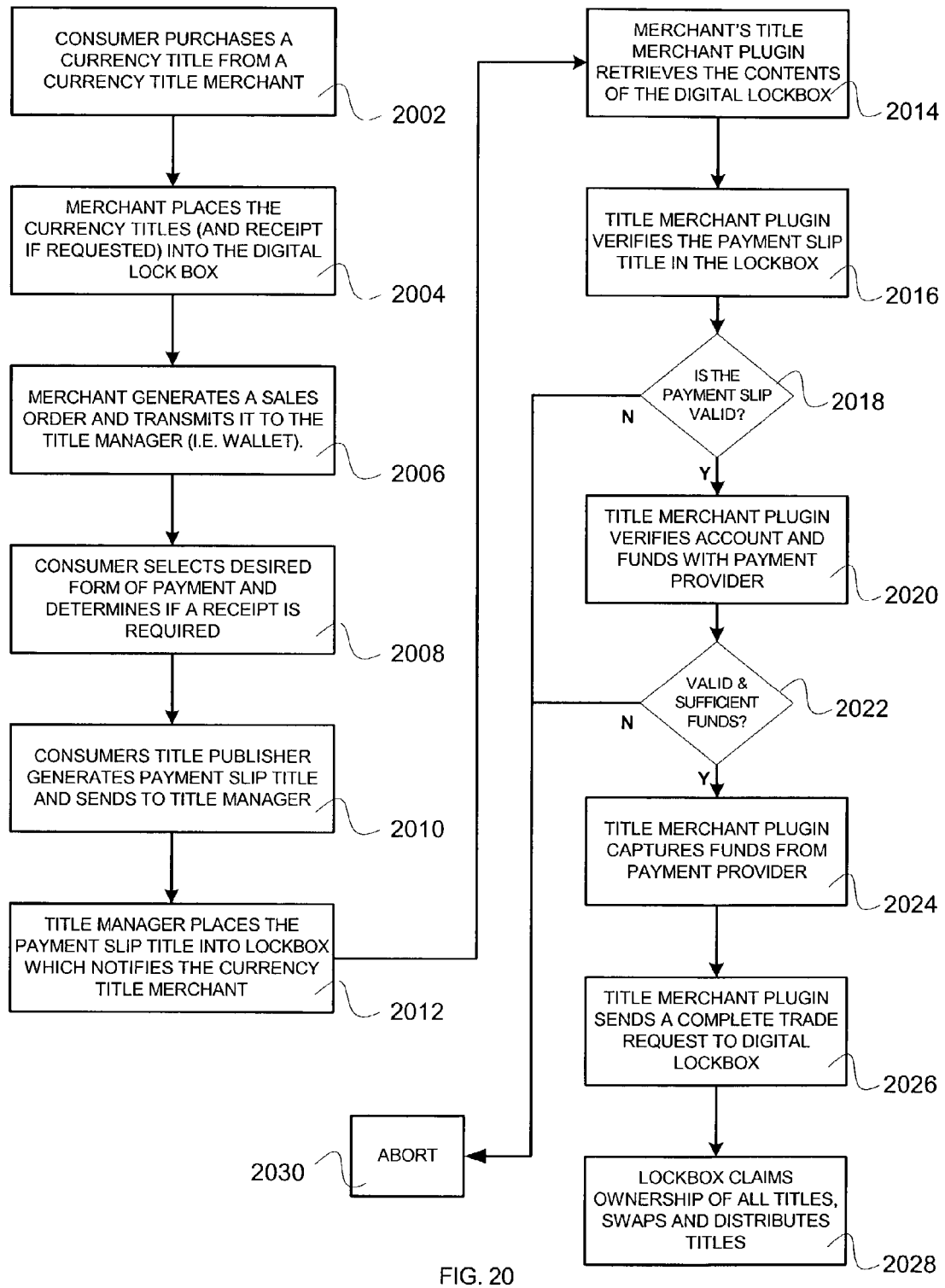

FIG. 20 is an exemplary flow chart describing the steps in which the consumer purchases additional currency title using an account payment structure for the payment slip title. In this example the user is using a credit card (identified) account in order to get currency titles. In step 2002, the consumer purchases the currency title from a merchant, such as BankStore.com. In step 2004, the merchant places the currency title and if requested a digital receipt into the digital lockbox 1212. In step 2006 the merchant generates a sales order title and transmits it to the consumer's title manager 1208. In step 2008, the consumer then selects the desired form of payment and if a receipt is required from the merchant. In this example, the consumer selects a checking account. In step 2010, the consumer's title publisher 1206 creates a payment slip title and in step 2012 the title manager 1208 places the payment slip title into the digital lockbox 1212 which then notifies the merchant. In step 2014, the merchant's title merchant plugin 1210*d* retrieves the contents of the lockbox. In step 2016, the title merchant plugin 1210*d* verifies the payment slip title and if valid (step 2018) verifies the account and funds in step 2020. If the account is valid and sufficient funds available (step 2022) the title merchant plugin sends a complete trade request to the digital lockbox in step 2024. In step 2026 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 21:
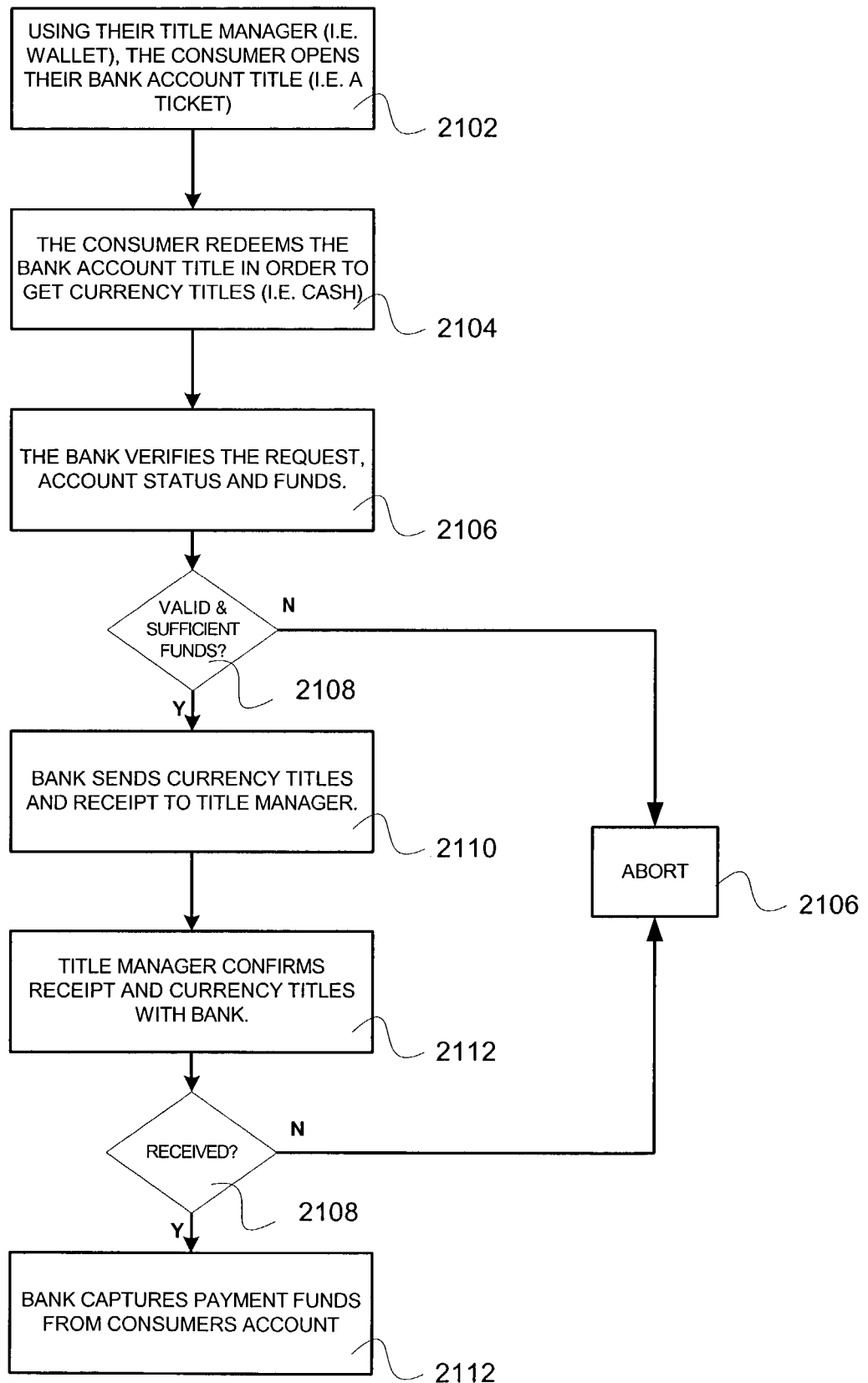

FIG. 21 is an exemplary flow chart describing the steps in which a consumer uses a bank checking account title to purchase currency titles. This flow is an alternate and simplified flow to that shown in FIG. 20 and is intended to demonstrate how a consumer can obtain currency similar to obtaining cash at an ATM. In step 2102 the consumer views their bank account title using the wallet function in the title manager 1208. Since this title access the consumer's checking account it would be a ticket. In step 2104 the consumer redeems the bank account title in order to get currency titles (e.g. cash). The redemption process could be one of many redeem methods that the bank account title supports and could be displayed to the consumer simply as "get cash". In step 2106 the bank verifies the request, account status, and ensures that sufficient funds are available. The bank processes this redemption request because of the instructions contained within the title and in this example the bank would be title enabled similar to the merchant site 1210. If valid and sufficient funds (step 2108), the bank sends the correct amount of currency titles to the consumer's title manager 2110. If the account is invalid or insufficient funds are available, then the process is aborted in step 2106. In step 2112 the title manager confirms receipt and currency titles with the bank. If the acknowledgement is received (step 2108) by the bank, then the bank complete its end of the transaction and captures payment funds from the consumers account in step 2112.

Figure 22A:
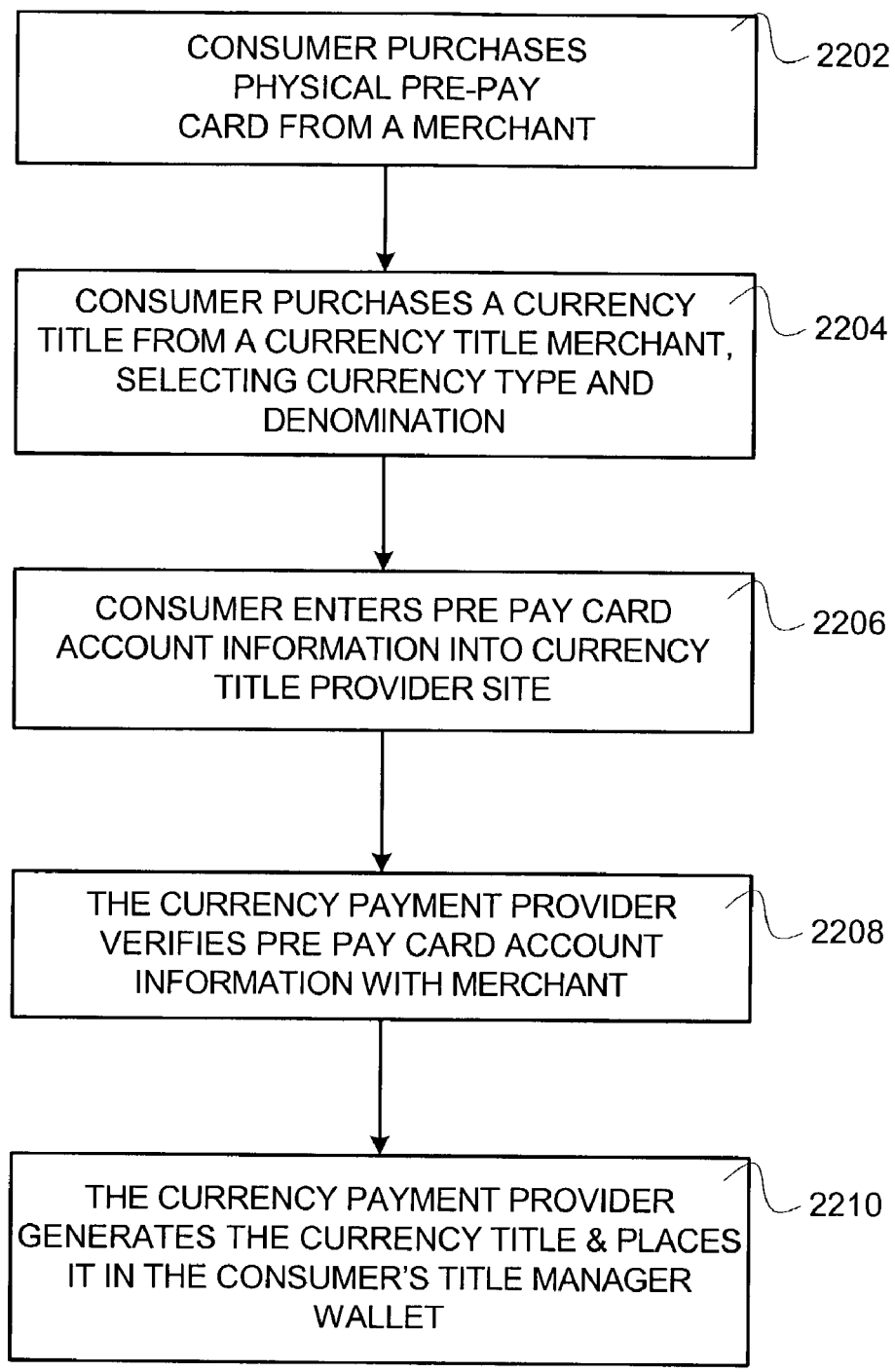

FIG. 22A is an exemplary flow chart describing the steps in which consumer uses a pre-pay card to purchase a currency title. In step 2202, the consumer purchases physical pre-pay card from a merchant. In step 2204, the consumer then uses the pre-pay card to purchase a currency title from a currency title merchant, selecting a specific currency type and denomination, for instance, $5.00. In step 2206, the consumer enters the pre-pay card account information into the currency title provider web site. In step 2208, the currency payment provider verifies the account information with the merchant. In step 2210, if the pre-pay card is valid, the currency payment provider generates the currency title and places it in the consumer's title manager wallet.

Figure 22B:
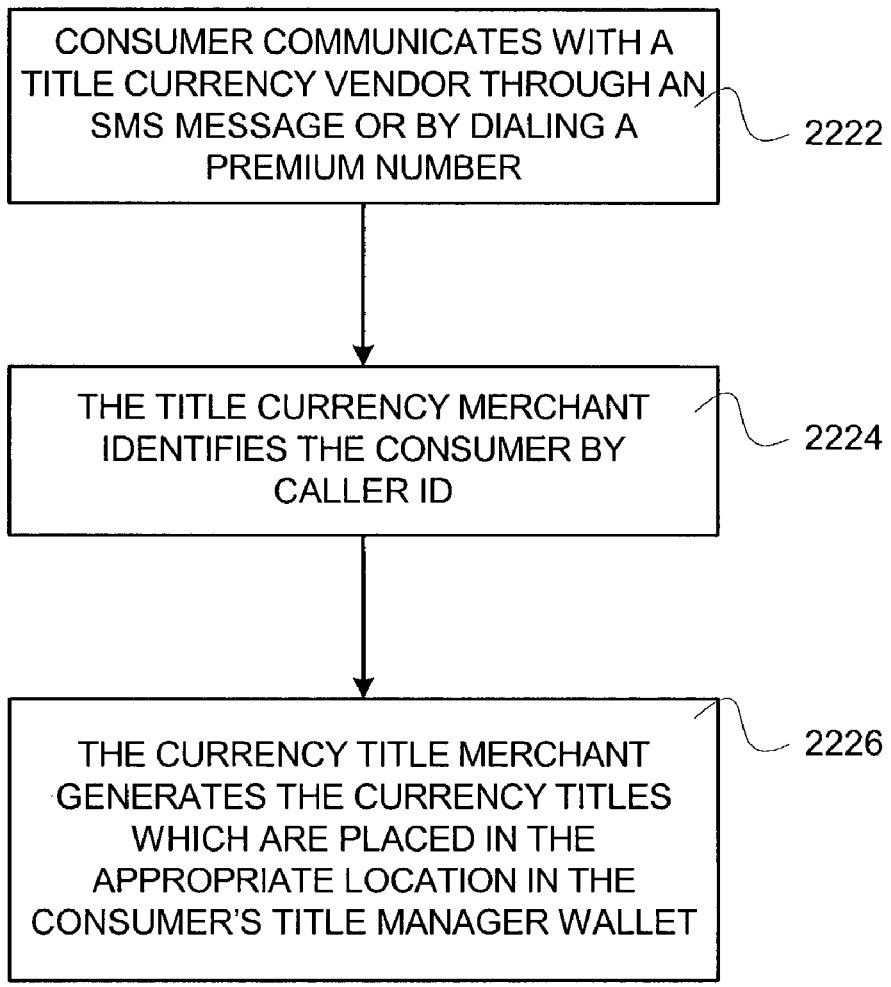

FIG. 22B is an exemplary flow chart describing the steps in which consumer bills the purchase of a currency title to a telecommunications account, such a mobile phone bill. In step 2222, the consumer communicates with a title currency vendor through an SMS message or by directly dialing the premium number. Upon receipt or connection in step 2224, the title currency merchant identifies the consumer by caller identification. In step 2226, the currency title merchant then generates the currency title which is placed in the appropriate location in the consumer's title manager wallet.

D. CONCLUSION

Advantages of the invention include the ability to easily and efficiently manage and share titles over a network such as the Internet. Additional advantages of the invention include creating an ecosystem whereby digital content providers can offload the burden of managing and enforcing user access rights, yet receive revenue from third party transactions.

Having disclosed exemplary embodiments and the best mode, modifications and variations may be made to the disclosed embodiments while remaining within the subject and spirit of the invention as defined by the following claims.

The invention claimed is:

1. A computer-implemented method for facilitating a transaction between a first entity and a second entity via a network comprising a plurality of computing devices, the method comprising:

storing a plurality of title objects on one or more of the computing devices, each title object representing at least one right which may be redeemed by presentation of the title object to a title-enabled process operating in the network, each title object encoding indicia preventing duplicate redemption of the title object, the indicia comprising an updateable state, each title object also encoding a pointer to a resource in the network to which the at least one right corresponds;

exchanging selected ones of the title objects between the first and second entities to effect the transaction and transfer of the rights represented by the selected title objects between the first and second entities, wherein exchanging the selected title objects comprises, transferring control of a first one of the selected title objects from a first title management process operating on one or more of the computing devices to which the first entity has access to a second title management process operating on one or more of the computing devices to which the second entity has access, and transferring control of a second one of the selected title objects from the second title management process to the first title management process; and in conjunction with exchange of the selected title objects, updating the updateable states encoded in each of the selected title objects to agree with correspondingly updated externally stored states for each of the selected title objects to transfer of the rights represented by the selected title objects between the first and second entities and to ensure that only a single valid instance of each of the selected title objects is in circulation in the network.

2. The method of claim 1 wherein exchange of the selected title objects is facilitated between or among any of the first entity, the second entity, a third entity responsible for facilitating a portion of the transaction, or any additional entities associated with the transaction.

3. The method of claim 2 wherein each of the first, second, and third entities comprises one of a human, a commercial enterprise, a computing device, or a software process.

4. The method of claim 1 wherein effecting the exchange of the selected title objects comprises transferring the first and second selected title objects to a lockbox process, the lockbox process being programmed to release the first and second selected title objects to a respective ones of the first entity and the second entity upon satisfaction of at least one criterion.

5. The method of claim 4 wherein the at least one criterion comprises a plurality of criteria.

6. The method of claim 4 wherein satisfaction of the at least one criterion is manually verified by one or both of the first and second entities.

7. The method of claim 4 wherein satisfaction of the at least one criterion is verified by an automated process associated with one or both of the first and second entities.

8. The method of claim 4 further comprising transferring additional ones of the selected title objects to the lockbox process, the lockbox process being programmed to release the additional selected title objects to one or both of the first and second entities upon satisfaction of the at least one criterion.

9. The method of claim 1 wherein transfer of control of the second selected title object to the first title management process effects a payment from the second entity to the first entity.

10. The method of claim 9 wherein the payment corresponds to an account, and wherein the second selected title object represents a right to charge the account.

11. The method of claim 9 wherein the payment corresponds to one or more of currency, reward points, personal profile information, a credit account, a debit account, a checking account, a bank account, a blinded account, a pre-paid account, a telecommunications account, or a secured account.

12. The method of claim 11 wherein the payment corresponds to currency, and wherein an amount of the payment exceeds a purchase price, the method further comprising transmitting a third one of the selected title objects to the second title management process, the third selected title object comprising a currency title object representing a currency value corresponding to a difference between the payment amount and the purchase price.

13. The method of claim 11 wherein the payment corresponds to currency of a first type, the method further comprising receiving a third one of the selected title objects from the second title management process, the third selected title object corresponding to currency of a second type, and exchanging the second selected title object for the third selected title object.

14. The method of claim 1 wherein transfer of control of the first selected title object to the second title management process effects transfer of at least one right to the second entity which may be redeemed by presentation of the first selected title object to a first process.

15. The method of claim 14 wherein the at least one right relates to one or more of access to content, access to a service, or access to a purchased item.

16. The method of claim 1 wherein effecting the exchange of the selected title objects comprises:

transmitting a sales order object to the second title management process in response to a purchase request associated with the second entity, the sales order object comprising transaction information which includes payment information specifying how payment may be effected; and transmitting a payment title object to the first title management process in response to the sales order object.

17. The method of claim 16 wherein the transaction information further includes one or more of a transaction identifier, a payment amount, information regarding an object of the transaction, or information regarding how to proceed with the transaction.

18. The method of claim 17 wherein the transaction information further identifies a lockbox process which is programmed to facilitate exchange of the selected title objects by receiving at least one of the selected title objects, and releasing the at least one selected title object upon satisfaction of at least one criterion.

19. The method of claim 18 wherein the at least one criterion comprises receipt and authentication of the payment title object.

20. The method of claim 16 wherein the payment information specifies payment using an account, and wherein the payment title object comprises a payment slip title object which represents a right to charge the account.

21. The method of claim 20 further comprising generating the payment slip title object with reference to the sales order object.

22. The method of claim 21 wherein generation of the payment slip title object is done with reference to payment logic which is part of the sales order object.

23. The method of claim 16 further comprising generating the purchase request in response to selection of an interface object in a user interface associated with the first entity.

24. The method of claim 23 wherein generating the purchase request comprises generating a purchase request title object, the method further comprising transmitting the purchase request title object to the first title management process.

25. The method of claim 23 wherein the interface object comprises one of the selected title objects and represents an offer from the first entity.

26. The method of claim 16 further comprising forwarding the payment title object from the first title management process to a third party payment provider, and effecting a corresponding payment from the third party payment provider to the first entity.

27. The method of claim 26 wherein effecting the payment comprises transmitting a second payment title object from the third party payment provider to the first title management process, the second payment title object representing the payment.

28. The method of claim 16 wherein the sales order object comprises one of the selected title objects.

29. The method of claim 1 further comprising transmitting instructions for facilitating a portion of the transaction to a first process.

30. The method of claim 29 wherein the first process comprises a lockbox process which is programmed to facilitate exchange of the selected title objects by receiving at least one of the selected title objects, and releasing the at least one selected title object upon satisfaction of at least one criterion.

31. The method of claim 29 wherein the instructions are represented by one of the selected title objects.

32. The method of claim 29 wherein the instructions relate to one or more of effecting payment, identification of at least one other process associated with the transaction, rules governing operation of any of the processes associated with the transaction, or terms and conditions associated with the transaction.

33. The method of claim 1 wherein the first selected title object comprises a first type of payment title object and the second selected title object comprises a second type of payment title object different from the first type, the first and second payment title objects having similar values.

34. The method of claim 33 wherein each of the first and second types of payment title objects relates to one or more of currency, reward points, personal profile information, a credit account, a debit account, a checking account, a bank account, a blinded account, a pre-paid account, a telecommunications account, or a secured account.

* * * * *